US007536274B2

(12) United States Patent
Heavner, III et al.

(10) Patent No.: US 7,536,274 B2
(45) Date of Patent: May 19, 2009

(54) SYSTEM AND METHOD FOR DETECTING AN ABNORMAL SITUATION ASSOCIATED WITH A HEATER

(75) Inventors: Louis W. Heavner, III, Austin, TX (US); Joseph H. Sharpe, Jr., Houston, TX (US); Evren Eryurek, Edina, MN (US); Kadir Kavaklioglu, Eden Prairie, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 11/079,808

(22) Filed: Mar. 14, 2005

(65) Prior Publication Data

US 2005/0267710 A1 Dec. 1, 2005

Related U.S. Application Data

(63) Continuation-in-part of application No. 10/944,609, filed on Sep. 17, 2004, now abandoned.

(60) Provisional application No. 60/575,631, filed on May 28, 2004.

(51) Int. Cl.
*G06F 11/30* (2006.01)

(52) U.S. Cl. ..................................... 702/183

(58) Field of Classification Search ............ 702/47, 702/50, 57, 98, 100, 116, 138, 179, 182–185, 702/188, 115; 60/776; 251/129.07; 123/357; 417/1
See application file for complete search history.

(56) References Cited

U.S. PATENT DOCUMENTS

| 4,359,984 | A | * | 11/1982 | Nakao ........................ 123/357 |
| 4,477,245 | A | * | 10/1984 | Giachino et al. ............... 431/78 |
| 4,527,271 | A |   | 7/1985  | Hallee et al. |
| 4,607,325 | A |   | 8/1986  | Horn |

(Continued)

FOREIGN PATENT DOCUMENTS

DE 102 32 164 2/2004

(Continued)

OTHER PUBLICATIONS

Wemwe Kalkhoff, "Agent-Oriented Robot Task Transformation", Proceedings of the International Symposium on Intelligent Control, IEEE, pp. 242-247 (Aug. 27, 1995).

(Continued)

*Primary Examiner*—Edward Raymond
*Assistant Examiner*—Mohamed Charioui
(74) *Attorney, Agent, or Firm*—Marshall, Gerstein & Borun LLP

(57) ABSTRACT

A system for detecting abnormal situations associated with a heater in a process plant receives statistical data associated with the heater unit. The statistical data is analyzed to detect whether one or more abnormal situations associated with the heater exist. The statistical data may comprise statistical data generated based on pressure variables sensed by one or more pressure sensors associated with a furnace, a stack, a fuel supply, etc., associated with the heater. Additionally, the statistical data may comprise statistical data generated based on temperature variables sensed by one or more temperature sensors associated with the furnace, the stack, etc. If an abnormal situation is detected, an indicator of the abnormal situation may be generated.

39 Claims, 7 Drawing Sheets

U.S. PATENT DOCUMENTS

| | | |
|---|---|---|
| 4,657,179 A | 4/1987 | Aggers et al. |
| 4,734,873 A | 3/1988 | Malloy et al. |
| 4,763,243 A | 8/1988 | Barlow et al. |
| 4,764,862 A | 8/1988 | Barlow et al. |
| 4,853,175 A | 8/1989 | Book, Sr. |
| 4,885,694 A | 12/1989 | Pray et al. |
| 4,907,167 A | 3/1990 | Skeirik |
| 4,910,691 A | 3/1990 | Skeirik |
| 4,944,035 A | 7/1990 | Aagardl et al. |
| 4,956,793 A | 9/1990 | Bonne et al. |
| 4,965,742 A | 10/1990 | Skeirik |
| 5,006,992 A | 4/1991 | Skeirik |
| 5,008,810 A | 4/1991 | Kessel et al. |
| 5,015,934 A | 5/1991 | Holley et al. |
| 5,018,215 A | 5/1991 | Nasr et al. |
| 5,043,863 A | 8/1991 | Bristol et al. |
| 5,050,095 A | 9/1991 | Samad |
| 5,070,458 A | 12/1991 | Gilmore et al. |
| 5,120,214 A * | 6/1992 | West et al. .................. 431/12 |
| 5,121,467 A | 6/1992 | Skeirik |
| 5,134,574 A | 7/1992 | Beaverstock et al. |
| 5,140,530 A | 8/1992 | Guha et al. |
| 5,142,612 A | 8/1992 | Skeirik |
| 5,161,013 A | 11/1992 | Rylander et al. |
| 5,167,009 A | 11/1992 | Skeirik |
| 5,187,674 A | 2/1993 | Bonne |
| 5,189,232 A | 2/1993 | Shabtai et al. |
| 5,193,143 A | 3/1993 | Kaemmerer et al. |
| 5,197,114 A | 3/1993 | Skeirik |
| 5,212,765 A | 5/1993 | Skeirik |
| 5,224,203 A | 6/1993 | Skeirik |
| 5,263,851 A * | 11/1993 | Hosome et al. .............. 431/79 |
| 5,282,261 A | 1/1994 | Skeirik |
| 5,291,190 A | 3/1994 | Scarola et al. |
| 5,301,101 A | 4/1994 | MacArthur et al. |
| 5,311,447 A | 5/1994 | Bonne |
| 5,311,562 A | 5/1994 | Palosamy et al. |
| 5,325,522 A | 6/1994 | Vaughn |
| 5,332,386 A * | 7/1994 | Hosome et al. .............. 431/12 |
| 5,333,298 A | 7/1994 | Bland et al. |
| 5,351,184 A | 9/1994 | Lu et al. |
| 5,353,207 A | 10/1994 | Keeler et al. |
| 5,369,599 A | 11/1994 | Sadjadi et al. |
| 5,373,452 A | 12/1994 | Guha |
| 5,384,698 A | 1/1995 | Jelinek |
| 5,390,326 A | 2/1995 | Shah |
| 5,396,415 A | 3/1995 | Konar et al. |
| 5,398,303 A | 3/1995 | Tanaka |
| 5,408,406 A | 4/1995 | Mathur et al. |
| 5,442,544 A | 8/1995 | Jelinek |
| 5,461,570 A | 10/1995 | Wang et al. |
| 5,465,219 A * | 11/1995 | Jeffers ....................... 700/274 |
| 5,486,920 A | 1/1996 | Killpatrick et al. |
| 5,486,996 A | 1/1996 | Samad et al. |
| 5,488,697 A | 1/1996 | Kaemmerer et al. |
| 5,499,188 A | 3/1996 | Kline, Jr. et al. |
| 5,521,842 A | 5/1996 | Yamoda |
| 5,533,413 A | 7/1996 | Kobayashi et al. |
| 5,537,310 A | 7/1996 | Tanake et al. |
| 5,541,833 A | 7/1996 | Bristol et al. |
| 5,546,301 A | 8/1996 | Agrawal et al. |
| 5,559,690 A | 9/1996 | Keeler et al. |
| 5,561,599 A | 10/1996 | Lu |
| 5,566,065 A | 10/1996 | Hansen et al. |
| 5,570,282 A | 10/1996 | Hansen et al. |
| 5,572,420 A | 11/1996 | Lu |
| 5,574,638 A | 11/1996 | Lu |
| 5,596,704 A | 1/1997 | Geddes et al. |
| 5,640,491 A | 6/1997 | Bhat et al. |
| 5,640,493 A | 6/1997 | Skeirik |
| 5,665,916 A | 9/1997 | Puster et al. |
| 5,666,297 A | 9/1997 | Britt et al. |
| 5,680,409 A | 10/1997 | Qin et al. |
| 5,687,090 A | 11/1997 | Chen et al. |
| 5,692,158 A | 11/1997 | Degeneff et al. |
| 5,704,011 A | 12/1997 | Hansen et al. |
| 5,715,158 A | 2/1998 | Chen |
| 5,729,661 A | 3/1998 | Keeler et al. |
| 5,740,324 A | 4/1998 | Mathur et al. |
| 5,742,513 A | 4/1998 | Bouhenguel et al. |
| 5,748,500 A * | 5/1998 | Quentin et al. .............. 702/182 |
| 5,761,518 A | 6/1998 | Boehling et al. |
| 5,764,891 A | 6/1998 | Warrior |
| 5,768,119 A | 6/1998 | Havekost et al. |
| 5,777,872 A | 7/1998 | He |
| 5,781,432 A | 7/1998 | Keeler et al. |
| 5,790,898 A | 8/1998 | Kishima et al. |
| 5,796,609 A | 8/1998 | Tao et al. |
| 5,798,939 A | 8/1998 | Ochoa et al. |
| 5,798,946 A * | 8/1998 | Khesin ....................... 700/274 |
| 5,803,724 A | 9/1998 | Oortwijn et al. |
| 5,805,442 A | 9/1998 | Crater et al. |
| 5,809,490 A | 9/1998 | Guiver et al. |
| 5,819,050 A | 10/1998 | Boehling et al. |
| 5,819,232 A | 10/1998 | Shipman |
| 5,825,645 A | 10/1998 | Konar et al. |
| 5,826,249 A | 10/1998 | Skeirik |
| 5,842,189 A | 11/1998 | Keeler et al. |
| 5,847,952 A | 12/1998 | Samad |
| 5,859,773 A | 1/1999 | Keeler et al. |
| 5,859,964 A | 1/1999 | Wang et al. |
| 5,877,954 A | 3/1999 | Klimasauskas et al. |
| 5,892,679 A | 4/1999 | He |
| 5,892,939 A | 4/1999 | Call et al. |
| 5,898,869 A | 4/1999 | Anderson |
| 5,901,058 A | 5/1999 | Steinman et al. |
| 5,905,989 A | 5/1999 | Biggs |
| 5,907,701 A | 5/1999 | Hanson |
| 5,909,370 A | 6/1999 | Lynch |
| 5,909,541 A | 6/1999 | Sampson et al. |
| 5,909,586 A | 6/1999 | Anderson |
| 5,918,233 A | 6/1999 | La Chance et al. |
| 5,924,086 A | 7/1999 | Mathur et al. |
| 5,940,290 A | 8/1999 | Dixon |
| 5,948,101 A | 9/1999 | David et al. |
| 5,949,417 A | 9/1999 | Calder |
| 5,960,214 A | 9/1999 | Sharpe, Jr. et al. |
| 5,960,441 A | 9/1999 | Bland et al. |
| 5,975,737 A | 11/1999 | Crater et al. |
| 5,984,502 A | 11/1999 | Calder |
| 5,988,847 A | 11/1999 | McLaughlin et al. |
| 6,008,985 A | 12/1999 | Lake et al. |
| 6,017,143 A * | 1/2000 | Eryurek et al. .............. 700/51 |
| 6,026,352 A | 2/2000 | Burns et al. |
| 6,033,257 A | 3/2000 | Lake et al. |
| 6,041,263 A | 3/2000 | Boston et al. |
| 6,047,220 A | 4/2000 | Eryurek |
| 6,047,221 A | 4/2000 | Piche et al. |
| 6,055,483 A | 4/2000 | Lu |
| 6,059,560 A * | 5/2000 | Richards et al. ............. 431/1 |
| 6,061,603 A | 5/2000 | Papadopoulos et al. |
| 6,067,505 A | 5/2000 | Bonoyer et al. |
| 6,071,114 A * | 6/2000 | Cusack et al. ............... 431/79 |
| 6,076,124 A | 6/2000 | Korowitz et al. |
| 6,078,843 A | 6/2000 | Shavit |
| 6,093,211 A | 7/2000 | Hamielec et al. |
| 6,106,785 A | 8/2000 | Havlena et al. |
| 6,108,616 A | 8/2000 | Borchers et al. |
| 6,110,214 A | 8/2000 | Klimasauskas |
| 6,119,047 A | 9/2000 | Eryurek et al. |
| 6,122,555 A | 9/2000 | Lu |
| 6,128,279 A | 10/2000 | O'Neil et al. |
| 6,144,952 A | 11/2000 | Keeler et al. |
| 6,169,980 B1 | 1/2001 | Keeler et al. |

| | | |
|---|---|---|
| 6,247,918 B1 * | 6/2001 | Forbes et al. ............... 431/12 |
| 6,266,726 B1 | 7/2001 | Nixon et al. |
| 6,277,268 B1 * | 8/2001 | Khesin et al. ............ 205/784.5 |
| 6,298,377 B1 | 10/2001 | Hartikainen et al. |
| 6,298,454 B1 | 10/2001 | Schleiss et al. |
| 6,317,701 B1 | 11/2001 | Pyötsiä et al. |
| 6,332,110 B1 | 12/2001 | Wolfe |
| 6,389,330 B1 * | 5/2002 | Khesin ...................... 700/274 |
| 6,397,114 B1 | 5/2002 | Eryurek et al. |
| 6,421,571 B1 | 7/2002 | Spriggs et al. |
| 6,445,963 B1 | 9/2002 | Blevins et al. |
| 6,532,392 B1 | 3/2003 | Eryurek et al. |
| 6,539,267 B1 * | 3/2003 | Eryurek et al. ................ 700/51 |
| 6,601,005 B1 * | 7/2003 | Eryurek et al. .............. 702/104 |
| 6,615,090 B1 | 9/2003 | Blevins et al. |
| 6,622,645 B2 * | 9/2003 | Havlena .................... 110/348 |
| 6,633,782 B1 | 10/2003 | Schleiss et al. |
| 6,640,548 B2 * | 11/2003 | Brushwood et al. ........... 60/776 |
| 6,715,348 B2 * | 4/2004 | Mokuo ....................... 73/299 |
| 6,775,645 B2 * | 8/2004 | Daw et al. ................. 702/188 |
| 6,795,798 B2 * | 9/2004 | Eryurek et al. .............. 702/188 |
| 6,813,532 B2 * | 11/2004 | Eryurek et al. .............. 700/108 |
| 6,901,351 B2 * | 5/2005 | Daw et al. ................. 702/188 |
| 6,925,338 B2 * | 8/2005 | Eryurek et al. ................ 700/30 |
| 7,010,459 B2 * | 3/2006 | Eryurek et al. .............. 702/182 |
| 7,025,810 B2 * | 4/2006 | Crawley et al. ............... 95/278 |
| 7,089,746 B2 * | 8/2006 | Lieuwen et al. .............. 60/779 |
| 2002/0022894 A1 | 2/2002 | Eryurek et al. |
| 2002/0029130 A1 * | 3/2002 | Eryurek et al. .............. 702/183 |
| 2002/0038156 A1 | 3/2002 | Eryurek et al. |
| 2002/0077711 A1 | 6/2002 | Nixon et al. |
| 2002/0099474 A1 * | 7/2002 | Khesin ...................... 700/274 |
| 2002/0123864 A1 * | 9/2002 | Eryurek et al. .............. 702/188 |
| 2002/0147506 A1 * | 10/2002 | Eryurek et al. ................ 700/28 |
| 2002/0147511 A1 | 10/2002 | Eryurek et al. |
| 2002/0161940 A1 | 10/2002 | Eryurek et al. |
| 2002/0163427 A1 | 11/2002 | Eryurek et al. |
| 2003/0014500 A1 | 1/2003 | Schleiss et al. |
| 2003/0168619 A1 * | 9/2003 | Jansen .................. 251/129.07 |
| 2004/0033140 A1 * | 2/2004 | Jensen et al. .................... 417/1 |
| 2004/0123652 A1 * | 7/2004 | Benson et al. ............. 73/118.1 |
| 2004/0249583 A1 * | 12/2004 | Eryurek et al. ................ 702/47 |
| 2005/0007249 A1 * | 1/2005 | Eryurek et al. .............. 340/511 |
| 2005/0033466 A1 * | 2/2005 | Eryurek et al. .............. 700/108 |
| 2005/0197803 A1 * | 9/2005 | Eryurek et al. .............. 702/185 |
| 2005/0197805 A1 * | 9/2005 | Eryurek et al. .............. 702/188 |
| 2006/0064182 A1 * | 3/2006 | Ford et al. .................... 700/79 |

FOREIGN PATENT DOCUMENTS

| | | |
|---|---|---|
| EP | 0 581 451 | 2/1994 |
| EP | 0 612 039 A3 | 8/1994 |
| EP | 0 626 697 A1 | 11/1994 |
| EP | 0 715 160 | 6/1996 |
| EP | 0 961 184 A2 | 12/1999 |
| EP | 0 964 325 A1 | 12/1999 |
| EP | 0 965 897 A1 | 12/1999 |
| GB | 2 294 129 A | 4/1996 |
| GB | 2 294 793 A | 5/1996 |
| GB | 2 347 234 A | 8/2000 |

OTHER PUBLICATIONS

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

Ashish Mehta, et al., "Feedforward Neural Networks for Process Identification and Prediction," presented at ISA 2001, Houston, Texas, Sep. 2001.

Vasiliki Tzovla, et al., "Abnormal Condition Management Using Expert Systems," presented at ISA 2001, Houston, Texas, Sep. 2001.

First Office Action for Chinese Patent Application No. 200580014496.7 dated Apr. 4, 2008.

International Search Report issued in PCT/US2005/014773, mailed Jul. 11, 2005.

Written Opinion issued in PCT/US2005/014773, mailed Jul. 11, 2005.

* cited by examiner

SYSTEM AND METHOD FOR DETECTING AN ABNORMAL SITUATION ASSOCIATED WITH A HEATER

CROSS-REFERENCES TO RELATED APPLICATIONS

This application is a continuation-in-part application of U.S. patent application Ser. No. 10/944,609, filed on Sep. 17, 2004, entitled "SYSTEM AND METHOD FOR DETECTING AN ABNORMAL SITUATION ASSOCIATED WITH A HEATER," which claims the benefit of U.S. Provisional Application No. 60/575,631, entitled "Improved Furnace Operation," filed on May 28, 2004. The present application also claims the benefit of U.S. Provisional Application No. 60/575,631. The above-referenced patent applications are hereby incorporated by reference herein in their entireties for all purposes.

FIELD OF THE DISCLOSURE

This disclosure relates generally to performing diagnostics and maintenance in a process plant and, more particularly, to providing diagnostics capabilities related to a heater.

BACKGROUND

Process control systems, like those used in chemical, petroleum or other processes, typically include one or more centralized or decentralized process controllers communicatively coupled to at least one host or operator workstation and to one or more process control and instrumentation devices such as, for example, field devices, via analog, digital or combined analog/digital buses. Field devices, which may be, for example, valves, valve positioners, switches, transmitters, and sensors (e.g., temperature, pressure, and flow rate sensors), are located within the process plant environment, and perform functions within the process such as opening or closing valves, measuring process parameters, increasing or decreasing fluid flow, etc. Smart field devices such as field devices conforming to the well-known FOUNDATION™ Fieldbus (hereinafter "Fieldbus") protocol or the HART® protocol may also perform control calculations, alarming functions, and other control functions commonly implemented within the process controller.

The process controllers, which are typically located within the process plant environment, receive signals indicative of process measurements or process variables made by or associated with the field devices and/or other information pertaining to the field devices, and execute controller applications. The controller applications implement, for example, different control modules that make process control decisions, generate control signals based on the received information, and coordinate with the control modules or blocks being performed in the field devices such as HART and Fieldbus field devices. The control modules in the process controllers send the control signals over the communication lines or signal paths to the field devices, to thereby control the operation of the process.

Information from the field devices and the process controllers is typically made available to one or more other hardware devices such as, for example, operator workstations, maintenance workstations, personal computers, handheld devices, data historians, report generators, centralized databases, etc. to enable an operator or a maintenance person to perform desired functions with respect to the process such as, for example, changing settings of the process control routine, modifying the operation of the control modules within the process controllers or the smart field devices, viewing the current state of the process or of particular devices within the process plant, viewing alarms generated by field devices and process controllers, simulating the operation of the process for the purpose of training personnel or testing the process control software, diagnosing problems or hardware failures within the process plant, etc.

While a typical process plant has many process control and instrumentation devices such as valves, transmitters, sensors, etc. connected to one or more process controllers, there are many other supporting devices that are also necessary for or related to process operation. These additional devices include, for example, power supply equipment, power generation and distribution equipment, rotating equipment such as turbines, motors, etc., which are located at numerous places in a typical plant. While this additional equipment does not necessarily create or use process variables and, in many instances, is not controlled or even coupled to a process controller for the purpose of affecting the process operation, this equipment is nevertheless important to, and ultimately necessary for proper operation of the process.

As is known, problems frequently arise within a process plant environment, especially a process plant having a large number of field devices and supporting equipment. These problems may take the form of broken or malfunctioning devices, logic elements, such as software routines, being in improper-modes, process control loops being improperly tuned, one or more failures in communications between devices within the process plant, etc. These and other problems, while numerous in nature, generally result in the process operating in an abnormal state (i.e., the process plant being in an abnormal situation) which is usually associated with suboptimal performance of the process plant. Many diagnostic tools and applications have been developed to detect and determine the cause of problems within a process plant and to assist an operator or a maintenance person to diagnose and correct the problems, once the problems have occurred and been detected. For example, operator workstations, which are typically connected to the process controllers through communication connections such as a direct or wireless bus, Ethernet, modem, phone line, and the like, have processors and memories that are adapted to run software or firmware, such as the DeltaV™ and Ovation control systems, sold by Emerson Process Management which includes numerous control module and control loop diagnostic tools. Likewise, maintenance workstations, which may be connected to the process control devices, such as field devices, via the same communication connections as the controller applications, or via different communication connections, such as OPC connections, handheld connections, etc., typically include one or more applications designed to view maintenance alarms and alerts generated by field devices within the process plant, to test devices within the process plant and to perform maintenance activities on the field devices and other devices within the process plant. Similar diagnostic applications have been developed to diagnose problems within the supporting equipment within the process plant.

Thus, for example, the Asset Management Solutions (AMS) application (at least partially disclosed in U.S. Pat. No. 5,960,214 entitled "Integrated Communication Network for use in a Field Device Management System") sold by Emerson Process Management, enables communication with and stores data pertaining to field devices to ascertain and track the operating state of the field devices. In some instances, the AMS application may be used to communicate with a field device to change parameters within the field device, to cause the field device to run applications on itself such as, for example, self-calibration routines or self-diagnostic routines, to obtain information about the status or health of the field device, etc. This information may include, for example, status information (e.g., whether an alarm or other similar event has occurred), device configuration information (e.g., the manner in which the field device is currently or may be configured and the type of measuring units used by the field device), device parameters (e.g., the field device range values and other parameters), etc. Of course, this information may be used by a maintenance person to monitor, maintain, and/or diagnose problems with field devices.

Similarly, many process plants include equipment monitoring and diagnostic applications such as, for example, RBMware provided by CSI Systems, or any other known applications used to monitor, diagnose, and optimize the operating state of various rotating equipment. Maintenance personnel usually use these applications to maintain and oversee the performance of rotating equipment in the plant, to determine problems with the rotating equipment, and to determine when and if the rotating equipment must be repaired or replaced. Similarly, many process plants include power control and diagnostic applications such as those provided by, for example, the Liebert and ASCO companies, to control and maintain the power generation and distribution equipment. It is also known to run control optimization applications such as, for example, real-time optimizers (RTO+), within a process plant to optimize the control activities of the process plant. Such optimization applications typically use complex algorithms and/or models of the process plant to predict how inputs may be changed to optimize operation of the process plant with respect to some desired optimization variable such as, for example, profit.

These and other diagnostic and optimization applications are typically implemented on a system-wide basis in one or more of the operator or maintenance workstations, and may provide preconfigured displays to the operator or maintenance personnel regarding the operating state of the process plant, or the devices and equipment within the process plant. Typical displays include alarming displays that receive alarms generated by the process controllers or other devices within the process plant, control displays indicating the operating state of the process controllers and other devices within the process plant, maintenance displays indicating the operating state of the devices within the process plant, etc. Likewise, these and other diagnostic applications may enable an operator or a maintenance person to retune a control loop or to reset other control parameters, to run a test on one or more field devices to determine the current status of those field devices, to calibrate field devices or other equipment, or to perform other problem detection and correction activities on devices and equipment within the process plant.

While these various applications and tools are very helpful in identifying and correcting problems within a process plant, these diagnostic applications are generally configured to be used only after a problem has already occurred within a process plant and, therefore, after an abnormal situation already exists within the plant. Unfortunately, an abnormal situation may exist for some time before it is detected, identified and corrected using these tools, resulting in the suboptimal performance of the process plant for the period of time during which the problem is detected, identified and corrected. In many cases, a control operator will first detect that some problem exists based on alarms, alerts or poor performance of the process plant. The operator will then notify the maintenance personnel of the potential problem. The maintenance personnel may or may not detect an actual problem and may need further prompting before actually running tests or other diagnostic applications, or performing other activities needed to identify the actual problem. Once the problem is identified, the maintenance personnel may need to order parts and schedule a maintenance procedure, all of which may result in a significant period of time between the occurrence of a problem and the correction of that problem, during which time the process plant runs in an abnormal situation generally associated with the sub-optimal operation of the plant.

Additionally, many process plants can experience an abnormal situation which results in significant costs or damage within the plant in a relatively short amount of time. For example, some abnormal situations can cause significant damage to equipment, the loss of raw materials, or significant unexpected downtime within the process plant if these abnormal situations exist for even a short amount of time. Thus, merely detecting a problem within the plant after the problem has occurred, no matter how quickly the problem is corrected, may still result in significant loss or damage within the process plant. As a result, it is desirable to try to prevent abnormal situations from arising in the first place, instead of simply trying to react to and correct problems within the process plant after an abnormal situation arises.

There is currently one technique that may be used to collect data that enables a user to predict the occurrence of certain abnormal situations within a process plant before these abnormal situations actually arise, with the purpose of taking steps to prevent the predicted abnormal situation before any significant loss within the process plant takes place. This procedure is disclosed in U.S. patent application Ser. No. 09/972,078, entitled "Root Cause Diagnostics" (based in part on U.S. patent application Ser. No. 08/623,569, now U.S. Pat. No. 6,017,143). The entire disclosures of both of these applications are hereby incorporated by reference herein. Generally speaking, this technique places statistical data collection and processing blocks or statistical processing monitoring (SPM) blocks, in each of a number of devices, such as field devices, within a process plant. The statistical data collection and processing blocks collect, for example, process variable data and determine certain statistical measures associated with the collected data, such as a mean, a median, a standard deviation, etc. These statistical measures may be analyzed to recognize patterns suggesting the future occurrence of a known abnormal situation. Once a particular suspected future abnormal situation is detected, steps may be taken to correct the underlying problem, thereby avoiding the abnormal situation in the first place.

Process heaters are commonly used in various process plants. A hydrocarbon fueled heater may be used to heat a process stream, for example, when steam heating is unavailable or inadequate for the task. Many process heaters do not employ induced draft (ID) fans or forced draft (FD) fans, but rely on chimney effect convection to control draft. Frequently, especially in the United States, process heaters include oxygen (O2) sensors in the stack and a damper to regulate airflow or draft pressure. Less frequently, a heater may include a carbon monoxide (CO) sensor.

An inadvertent release of smoke from a heater stack may cause environmental problems, may result in government-imposed penalties and/or constraints, and may cause public relations friction with the surrounding communities. The O2 level sensed by an O2 sensor in the stack may be used to detect when a smoking event is occurring. When a smoke event is detected, the damper may be adjusted to end or mitigate the smoke release. The O2 level, however, may not always indicate that a smoke event is occurring. A CO level sensed by a CO sensor, when present, can also be used to detect when a smoking event is occurring. The O2 and CO levels, however, do not give advanced warning of a smoke event, but rather only indicate that the smoke event has occurred.

Typically, fuel flow to a process heater is adjusted to maintain a desired temperature. Rapid or large changes in fuel flow can create flame instability and flame-out. Process heaters often include a flame detector to detect when a flame-out has occurred. When a flame detector has detected a flame-out, fuel flow to the heater may be shut off.

SUMMARY

A system for detecting abnormal situations associated with a heater in a process plant receives statistical data associated with the heater unit. Abnormal situations to be detected may be situations associated with a smoke release or a flame-out, for example. The statistical data is analyzed to detect whether one or more abnormal situations associated with the heater exist. The statistical data may comprise statistical data generated based on pressure variables sensed by one or more pressure sensors associated with a furnace, a stack, a fuel supply, etc., associated with the heater. Additionally, the statistical data may comprise statistical data generated based on temperature variables sensed by one or more temperature sensors associated with the furnace, the stack, etc. The statistical data may be analyzed to determine whether variability, for example, of a pressure variable, a temperature variable, etc., has changed or increased. If an abnormal situation is detected, an indicator of the abnormal situation may be generated. The indicator may be used, for example, to notify an operator or affect control of the heater.

DETAILED DESCRIPTION

Figure 1:
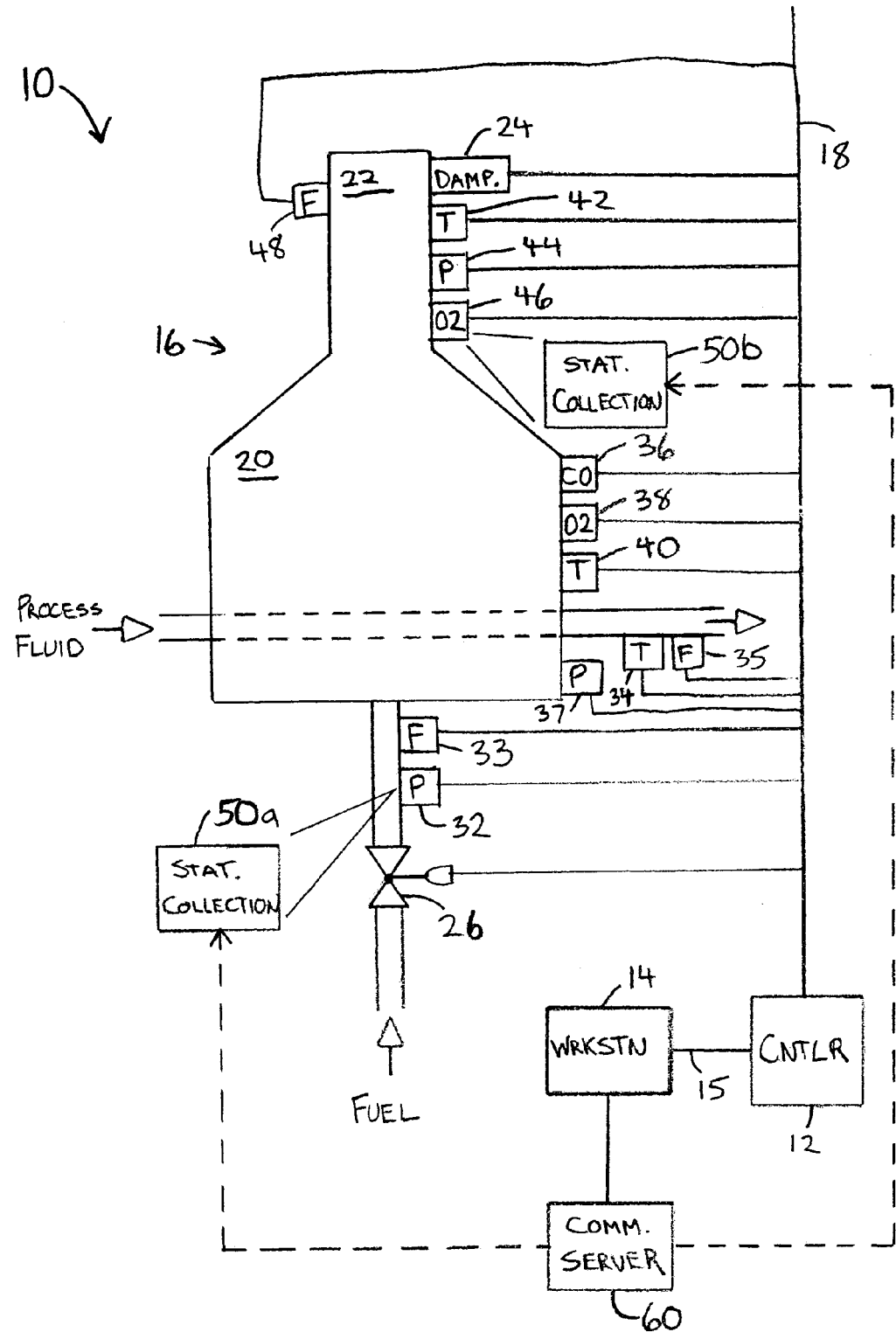
FIG. 1 is a block diagram of an example process plant control and diagnostics network.

FIG. 1 is a block diagram of an example process plant control and diagnostics network 10 that includes a process controller 12 coupled to a workstation 14 via a communication link 15. The communication link 15 may comprise, for example, an Ethernet communications connection, or any other type of wired, optical, or wireless communications connection. Additionally, the communication link 15 may be a continuous or intermittent link. The controller 12 is also coupled to devices or equipment within a process plant via an input/output (I/O) device (not shown) and a set of communication lines or a bus 18. In the example of FIG. 1, the controller 12 is coupled to devices and equipment associated with a heater unit 16 (e.g., crude heaters, fluid heaters, refinery heaters, petrochemical heaters, petroleum heaters, boilers, reboiler heaters, gas heaters, charge heaters, feed heaters, vacuum heaters, liquid heaters, column heaters, pipeline heaters, storage heating systems, etc.). The controller 12, which may be by way of example only, the DeltaV™ controller sold by Emerson Process Management, Inc., is capable of communicating with control elements, such as field devices and function blocks within field devices distributed throughout the process plant to perform one or more process control routines to thereby implement desired control of the heater unit 16. These process control routines may be continuous or batch process control routines or procedures. The workstation 14 (which may comprise, for example, a personal computer, a server, etc.) may be used by one or more engineers or operators to design process control routines to be executed by the controller 12, to communicate with the controller 12 so as to download such process control routines, to receive and display information pertaining to the heater unit 16 during operation of the process plant and to otherwise interact with the process control routines executed by the controller 12.

The workstation 14 includes a memory (not shown) for storing applications, such as configuration design applications, maintenance applications, user interface applications, diagnostics applications, etc., and for storing data, such as configuration data, maintenance data, diagnostics data, etc., pertaining to the configuration of the heater unit 16. The workstation 14 also includes a processor (not shown) that executes the applications to, among other things, enable a user to design process control routines and download those process control routines to the controller 12. Likewise, the controller 12 includes a memory (not shown) for storing configuration data and process control routines to be used to control the heater unit 16 and includes a processor (not shown) that executes the process control routines to implement a process control strategy. If the controller 12 is a DeltaV™ controller, it, in conjunction with one or more applications implemented by the workstation 14, may provide a graphical depiction of the process control routines within the controller 12 to a user illustrating the control elements within the process control routine and the manner in which these control elements are configured to provide control of the heater unit 16.

In the example process plant control and diagnostics network 10 illustrated in FIG. 1, the controller 12 is communicatively coupled via the bus 18 to the heater unit 16. The heater unit 16 includes a furnace 20 through which a process fluid passes and is heated by the furnace 20, and a stack 22. A damper device 24 in the stack 22 regulates airflow and/or draft pressure, and a fuel valve 26 regulates fuel to the furnace. The heater unit 16 may also include a number of sensor devices such as sensor devices associated with the fuel flow, sensor devices associated with the process fluid flow, sensor devices associated with the furnace, and sensor devices associated with the stack. In the example heater unit 16, a pressure sensing device 32 may be used to sense fuel pressure and a flow sensing device 33 may be used to sense fuel flow downstream from the valve 24. A temperature sensing device 34 may be used to sense the temperature and a flow sensing device 35 may be used to sense the flow of the process fluid exiting the furnace 20. Although only one pass of process fluid through the furnace 20 is shown in FIG. 1, in a typical heater unit, the process fluid may pass through the furnace multiple times and a temperature sensing device (not shown) and/or flow sensing device (not shown) may sense temperature and/or flow of the process fluid after each pass. One or more sensor devices may be used to sense conditions within the furnace including a CO sensing device 36, a pressure sensing device 37, an O2 sensing device 38, and a temperature sensing device 40. Similarly, one or more sensor devices may be used to sense conditions within the stack including a temperature sensing device 42, a pressure sensing device 44, an O2 sensing device 46, and an air flow sensing device 48. A particular implementation may omit one or more of these sensor devices. For example, although both the O2 sensing device 38 and the O2 sensing device 46 are shown in FIG. 1, a typical heater unit may have only one of O2 sensing device that is associated with either the stack or with the furnace.

As illustrated in FIG. 1, the controller 12 is communicatively coupled to the damper device 24, the valve device 26, and the sensing devices 32-38, 40, 42, 44, 46, and 48 via the bus 18 to control the operation of, and/or to receive data from, these elements. Of course, the controller 12 could be coupled to the elements of the heater unit 16 via additional busses, via dedicated communication lines, such as 4-20 ma lines, HART communication lines, etc.

The valves, sensors and other equipment illustrated in FIG. 1 may be any desired kind or type of equipment including, for example, Fieldbus field devices, standard 4-20 ma field devices, HART field devices, etc. and may communicate with the controller 12 using any known or desired communication protocol such as the Fieldbus protocol, the HART protocol, the 4-20 ma analog protocol, etc. Still further, other types of devices may be connected to and be controlled by the controller 12 in any desired manner. Also, other controllers may be connected to the controller 12 and/or to the workstation 14 via, for example, the communication link 15 to control other devices or areas associated with the process plant and the operation of such additional controllers may be coordinated with the operation of the controller 12 illustrated in FIG. 1 in any desired or known manner.

With respect to the furnace 20, for example, one or more other sensing devices in addition to, or instead of, the CO sensing device 36, the pressure sensing device 37, the O2 sensing device 38, and the temperature sensing device 40 could be used. With respect to the stack 22, for example, one or more other sensing devices in addition to, or instead of, the temperature sensing device 42, the pressure sensing device 44, the O2 sensing device 46, and the air flow sensor 48 could be used. For instance, a CO sensing device associated with the stack 22 could be used in addition to the devices shown in FIG. 1, or instead of one or more of those devices.

Each of one or more of the sensing devices 32-38, 40, 42, 44, 46, and 48 may include a memory (not shown) for storing routines such as a routine for implementing statistical data collection pertaining to one or more process variables sensed by sensing device. Each of one or more of the sensing devices 32-38, 40, 42, 44, 46, and 48 may also include a processor (not shown) that executes routines such as a routine for implementing statistical data collection. The routines stored and implemented by a sensing device may include one or more blocks for collecting and/or processing statistical data associated with the sensing device. Such a block could comprise, for example, an advanced diagnostics block (ADB), which is a known Foundation Fieldbus function block that can be added to Fieldbus devices to collect and process statistical data within Fieldbus devices. Other types of blocks or modules could also be used to collect device data and calculate, determine, and/or process one or more statistical measures or parameters for that data. Moreover, the sensing devices need not comprise Fieldbus devices. Further, the statistical data collecting and/or processing block may be implemented by any combination of software, firmware, and/or hardware within the sensing device.

As an example, the pressure sensing device 32 may include a memory (not shown) for storing routines such as a routine for implementing statistical data collection pertaining to pressure sensed by the pressure sensing device 32. The pressure sensing device 32 may also include a processor (not shown) that executes routines such as a routine for implementing statistical data collection. The routines stored and implemented by the pressure sensing device 32 may include one or more blocks 50a for collecting and/or processing statistical data associated with the pressure sensing device 32. For example, the block 50a could comprise an ADB or some other type of statistical data collection block. The pressure sensing device 32 need not comprise a Fieldbus device.

As another example, the O2 sensing device 46 may include a memory (not shown) for storing routines such as a routine for implementing statistical data collection pertaining to O2 sensed by the O2 sensing device 46. The O2 sensing device 46 may also include a processor (not shown) that executes routines such as a routine for implementing statistical data collection. The routines stored and implemented by the O2 sensing device 46 may include one or more blocks 50b for collecting and/or processing statistical data associated with the O2 sensing device 46. For example, the block 50b could comprise an ADB or some other type of statistical data collection block. The O2 sensing device 46 need not comprise a Fieldbus device.

While the block 50a and the block 50b are illustrated as being located in the pressure sensing device 32 and the O2 sensing device 46, respectively, the blocks 50 could be located, in part or in whole, in any number of the other field devices 24, 26, 33-36, 38, 40, 42, 44, 46, and 48 and could be located, in part or in whole, in other devices, such as the controller 12, an I/O device (not shown), the workstation 14, or some other device. It is to be understood that some or all of the other devices 24, 26, 33-36, 38, 40, 42, 44, 46, and 48 could implement other blocks or modules for collecting data associated with those other devices and for calculating, determining and/or processing one or more statistical measures or parameters for that data.

Although sensing devices 32 and 46 in FIG. 1 are illustrated to include data collection blocks 50a and 50b, respectively, other of the devices 24, 26, 33-36, 38, 40, 42, 44, 46, and 48 could additionally or alternatively include similar data collection blocks 50.

Generally speaking, the block 50a, or sub-elements of the block 50a, collects data, such as data related to the pressured sensed downstream from the valve 26, and performs statistical processing or analysis on the data. The block 50a may include sub-elements such as one or more statistical process monitoring (SPM) blocks or units which may collect data related to the pressured sensed downstream from the valve 26 or other data associated with the pressure sensing device 32 and perform one or more statistical calculations on the collected data to determine, for example, a mean, a median, a standard deviation, etc. of the collected data.

Similarly, the block 50b, or sub-elements of the block 50b, collects data, such as data related to the O2 sensed in the stack 22, and performs statistical processing or analysis on the data. The block 50b may include sub-elements such as one or more SPM blocks or units which may collect data related to the O2 sensed within the stack 22 or other data associated with the O2 sensing device 46 and perform one or more statistical calculations on the collected data to determine, for example, a mean, a median, a standard deviation, etc. of the collected data.

The term statistical process monitoring (SPM) block is used herein to describe functionality that performs statistical process monitoring on at least one process variable or other process parameter, and may be performed by any desired software, firmware or hardware implemented by or within the device or even outside of a device for which data is collected. It will be understood that, because the SPMs are generally implemented by, or as part of, the devices where the device data is collected, the SPMs can acquire quantitatively more and qualitatively more accurate process variable data. As a result, the SPM blocks are generally capable of determining better statistical calculations with respect to the collected process variable data than a block implemented outside of the device in which the process variable data is collected.

While the SPM blocks have been described herein as being sub-elements of ADBs, they may instead be stand-alone blocks located within a device. Also, while the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software, firmware, hardware and/or other elements that perform this function, whether these elements are in the form of function blocks, or other types of blocks, programs, routines or elements and whether or not these elements conform to the Foundation Fieldbus protocol, or some other protocol, such as Profibus, HART, CAN, etc. protocol. If desired, the underlying operation of blocks 50 may be performed or implemented as described in U.S. Pat. No. 6,017,143.

It is to be understood, however, that the blocks 50 may be performed or implemented using techniques different than those described in U.S. Pat. No. 6,017,143. As just one example, U.S. Pat. No. 6,615,090 to Blevins et al. describes a variability index generator that generates a variability indication for a function block within a process plant. In general, the variability indication provides a statistical measurement of the deviation of a parameter associated with the device or function block from a set point or other value associated with the device or function block. U.S. Pat. No. 6,615,090 is herby incorporated by reference herein in its entirety for all purposes.

Data gathered and generated by some or all of the blocks 50 may be made available to an external client, such as to the workstation 14 through the controller 12 and the communication link 15. Additionally or in the alternative, data gathered and generated by some or all of the blocks 50 may be made available to the workstation 14 through, for example, a communication server 60. The communication server 60 may comprise, for example, an Object Linking & Embedding (OLE) for Process Control (OPC) server, a server configured to operate in an Ovation® communications network, a web server, etc. The communication server 60 may receive data gathered and generated by some or all of the blocks 50 via a communication link such as a wireless connection, a hardwired connection, an intermittent connection (such as one that uses one or more handheld devices), or any other desired communication connection using any desired or appropriate communication protocol. Of course, any of the communication connections described herein may use an OPC communication server to integrate data received from different types of devices in a common or consistent format.

Still further, it is possible to implement SPM blocks in a workstation, server, personal computer, etc., or other field devices separate from the field device to perform statistical process monitoring outside of the field device that collects or generates the raw data, such as pressure data, temperature data, O2 data, etc. Thus, for example, one or more SPM blocks could be implemented by the workstation 14. These SPM blocks could collect raw pressure data via, for example, the controller 12 or the communication server 60 and could calculate some statistical measure or parameter, such as a mean, a standard deviation, etc. for that pressure data. While these SPM blocks are not located in the field device which collects the data and, therefore, generally may not be able to collect as much pressure data to perform the statistical calculations due to the communication requirements for this data, these blocks are helpful in determining statistical parameters for a device that does not have or support SPM functionality. Thus, it will be understood in the discussion below, that any statistical measurements or parameters described to be generated by SPM blocks, may be generated by SPM blocks implemented by the field device or by other devices.

In operation, the controller 12 may control the fuel flow to the furnace via the valve 26. The temperature sensing device 34 may provide data that indicates a temperature of the process fluid exiting the furnace 20. Additionally, the controller 12 may control the airflow and/or draft pressure in the stack 22 via the damper device 24.

Figure 2:
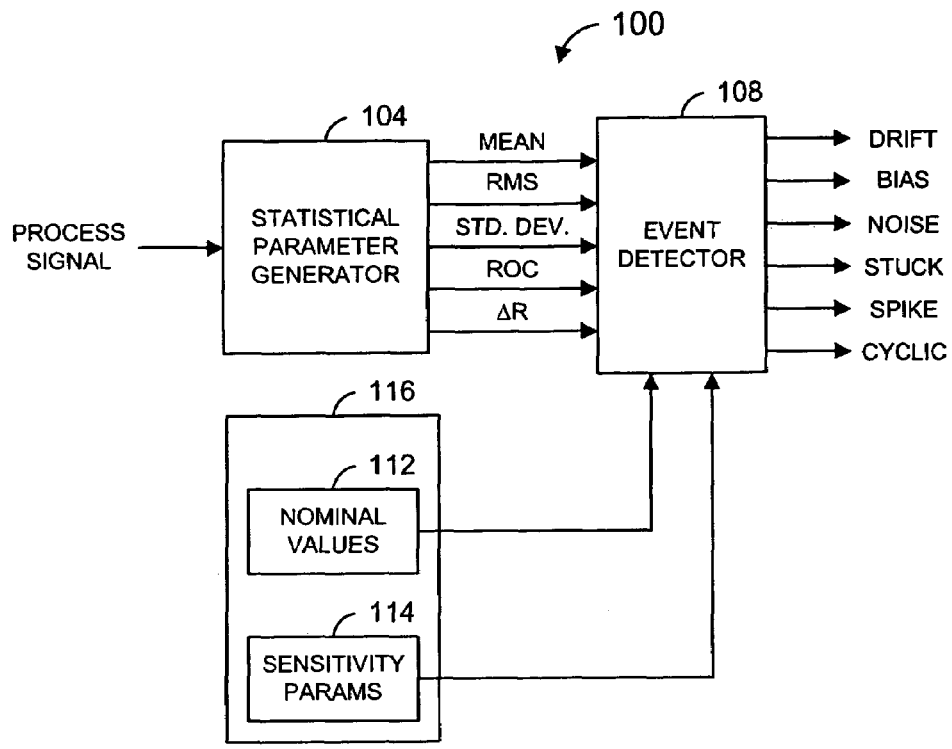
FIG. 2 is a block diagram of an example subsystem for generating statistical data based on process variables.

FIG. 2 is a block diagram of an example subsystem 100 for generating statistical data associated with a field device such as the devices 32-38, 40, 42, 44, 46, and 48. The subsystem 100 may be implemented, for example, as part of a data collection block 50, and may be implemented in whole or in part by a single field device. Further, each block illustrated in FIG. 2 may be implemented in whole or in part by a different single field device. Thus, some or all of the subsystem 100 may be implemented by a plurality of devices such as field devices, the controller 12, the workstation 14, the communication server 60, or some other computing device associated with the process plant. The subsystem 100 may be implemented, for example, as part of an ADB, an SPM block, etc. The subsystem 100 includes aspects similar to those of a process device described in U.S. Pat. No. 6,017,143.

A statistical parameter generator 104 receives a process signal generated by the field device and calculates statistical parameters for the process signal. These statistical parameters may include one or more of a standard deviation, a mean, a sample variance, a root-mean-square (RMS), a range ($\Delta R$) a rate of change (ROC) of the process signal, a maximum of the process signal, and a minimum of the process signal, for example. Examples of equations for generating these parameters include:

$$\text{mean} = \frac{1}{N}\sum_{i=1}^{N} x_i \qquad \text{(Equ. 1)}$$

$$\text{RMS} = \sqrt{\frac{1}{N}\sum_{i=1}^{N} x_i^2} \qquad \text{(Equ. 2)}$$

$$\text{standard deviation} = \sqrt{\frac{1}{N-1}\sum_{i=1}^{N}(x_i - \text{mean})^2} \qquad \text{(Equ. 3)}$$

-continued $$ROC = \frac{x_i - x_{i-1}}{T} \quad \text{(Equ. 4)}$$

$$\Delta R = X_{MAX} - X_{MIN} \quad \text{(Equ. 5)}$$

where N is the total number of data points in the sample period, $x_i$ and $x_{i-1}$ are two consecutive values of the process signal and T is the time interval between the two values. Further, $X_{MAX}$ and $X_{MIN}$ are the respective maximum and minimum of the process signal over a sampling or training time period. These statistical parameters may be calculated using different equations or algorithms as well.

Also, other types of parameters may be generated in addition to, or instead of, these parameters. For example, the process signal may be filtered (e.g., using a low pass, high pass, band pass, etc., filter) to generated a corresponding parameter. One or more filters may be included and each may comprise, for example, a finite impulse response or an infinite impulse response filter. Further, analog or digital filters could be used, for example. Still further, correlation parameters could be generated. For example, a correlation of the process signal with a pattern, with a past segment of the process signal, with a signal corresponding to another process signal, etc., could be generated. In one example, the statistical parameter generator 104 may comprise one or more ADBs and/or SPM blocks.

Further, techniques for generating parameters may be combined. For instance, the process signal could be filtered and/or processed in some other way prior to generating any of the above discussed parameters. As just one particular example, the process signal could be trimmed prior to being used to generate a parameter. Trimming may comprise discarding or limiting process signal samples that fall above a first threshold or fall below a second threshold, for example. Trimming may also comprise discarding or limiting process signal samples that exceed a first percentage of the range (e.g., Equ. 5) or fall below a second percentage of the range, for example. After trimming and prior to being used to generate one or more parameters, the process signal optionally could be filtered. One of ordinary skill in the art will recognize many other possible combinations, variations, and alternatives.

One or more of the statistical parameters may be provided to an event detector 108. The event detector 108 may also receive nominal values 112 and sensitivity parameters 114 from a memory 116. The nominal values 112 may comprise, for example, the nominal or (i.e., typical) statistical parameter values corresponding to the statistical parameters generated by the statistical parameter generator 104. The nominal values may be, for example, generated by the statistical parameter generator 104 which generates, or learns, the nominal or normal statistical parameters during normal operation of the process. These statistical parameters can be used to generate the nominal values 112 in the memory 116 for future use. This may allow, for example, dynamic adjustment of nominal values 112 for different operating conditions. In this example, the statistical parameters generated by the statistical parameter generator 104 may be monitored for a user selectable period of time. As another example, the nominal values may be provided by the manufacturer of the pressure sensing device 50 and stored in the memory 116 during manufacture. As yet another example, the nominal values may be updated, periodically or otherwise, by sending nominal values via the bus 18 (FIG. 1) or some other communication link to the device that implements the event detector 108.

Each sensitivity parameter value 114 may provide, for example, an acceptable range or relationship as determined by the appropriate rule between the calculated statistical parameters 114 and the appropriate nominal values generated by the statistical parameter generator 104. The sensitivity parameter values 114 may be, for example, set by the manufacturer, received via the bus 18, etc. The sensitivity parameters 114 may be adjusted for the specific application.

The event detector 108 may generate indications of one or more events associated with the one or more parameters generated by the parameter generator 104. Examples of events that the event detector 108 may detect are discussed below. The event detector 108 may detect other events in addition to, or instead of, these events.

Drift

An indication of a drift event may be generated, for example, when the process signal changes over time from a nominal value. In one example, the mean of the process signal, the nominal value of the mean (mean'), and a tuning parameter alpha ($\alpha$) may be analyzed to detect a drift event. Drift event detection sensitivity may be controlled by the sensitivity parameter $\alpha$, which may represent a percentage above or below the nominal mean that is tolerable before a drift event is detected. The event detector 108 may determine if drift events occur according to the following example rules:

if mean<mean' (1−$\alpha$) then negative drift event detected if mean>mean' (1+$\alpha$) then positive drift event detected, where the value of mean is the current mean of the process signal generated from the statistical parameter generator 104 and the values of mean' and $\forall$ are obtained from the memory 116. Optionally, the mean may be monitored over time, and a drift event may be detected only if, over a series of consecutive sampling periods, the mean is moving away from the nominal value. The nominal value of mean (mean') may be learned by the subsystem 100 during normal operation of the process.

Bias

An indication of a bias event may be generated, for example, when a temporary drift "stabilizing" at a certain level above or below the nominal process value occurs. Once the drift stops, the resulting signal has a bias, or an offset from the nominal value. A bias may be detected using, at least in part, the same rules discussed above for drift, for example. Additionally, the mean may be monitored over time, and if the mean is not continuing to move away from the nominal mean value (mean'), then it may be determined that the event is a bias event and not a drift event.

Noise

An indication of a noise event may be generated if the standard deviation of the process signal rises above a threshold. In one example, noise detection sensitivity may be adjusted by adjusting a sensitivity parameter beta ($\beta$), which is an amount that the current standard deviation can be above the nominal standard deviation value (standard deviation') before an indication of a noise event is generated. For example, if the user desires to detect a noise event when the process signal is twice as noisy as the nominal value, $\beta$ should be sent to 2.0. Range ($\Delta R$) may also used to determine whether to generate a noise event. For example, $\Delta R$ could be used to differentiate noise from normal signal variations. An example rule for determining whether a noise event has occurred is:

if standard deviation>β·standard deviation' AND if ΔR>ΔR' then noise event detected where "standard deviation" and ΔR are the current standard deviation and the current range, respectively, generated by the statistical parameter generator 104, and β is retrieved from the memory 116.

Stuck

A stuck event is an event in which a condition of the process signal does not vary with time. Stuck sensitivity may be controlled by adjusting a sensitivity parameter gamma (γ). A value for γ may be expressed as a percentage of the nominal standard deviation (standard deviation40) and may represent how small a change in standard deviation from the nominal value indicates a stuck event. For example, if a user wishes to detect a stuck event when the process signal noise level is half of the nominal value, γ should be set equal to 50 percent (0.5). Further, the range (ΔR) may be used to reduce stuck event detection errors that might arise with small signals. One example rule is:

If (standard deviation+ΔR)≦γ(standard deviation'+ΔR') then stuck event is detected.

Spike

A spike event is an event in which the process signal momentarily goes to an extreme value. Sensitivity to spikes in the process signal may be controlled by adjusting a sensitivity parameter delta (δ), which may indicate a maximum rate of change ($ROC_{MAX}$) between two consecutive data points in the process signal before a spike event is detected. For example, if the user wishes to detect any spikes that have a rate of change (ROC) that is 30% greater than $ROC_{MAX}$, δ should be set to 1.30. An example rule is:

if ROC>δ·$ROC_{MAX}$ then a spike event is detected

Another method for detecting a spike may include detecting if the process signal stays above a positive (or upper) threshold, or stays below a negative (or lower) threshold, for some period of time. The threshold values and/or time periods could be adjusted for different sensitivities to spike events.

Other events that may be detected include a cyclic event that indicates cyclical oscillations in the process signal and an erratic event that indicates erratic behavior in the process signal. It should be understood that other rules may be implemented to observe the above discussed events as well as other events related to the process signal, and different formulas, equations, computational techniques, etc., may be used to detect events.

Detecting an event may include analyzing more than one statistical parameter generated by the statistical parameter generator 104, analyzing statistical parameters based on signals other than the process signal, etc. For example, statistical parameters may be generated by, or associated with, another field device (using a subsystem similar to the subsystem 100, for example) based on data obtained by that field device. The event detector 108 implemented by one field device could receive one or more of the statistical parameters or other types of data generated by one or more other field devices and use these data in analyzing whether events have occurred.

As one example, nominal values may be obtained by first determining that the process signal or the process is stable, and then generating the statistical parameters for a selectable period of time. These statistical parameter values may be stored as the nominal values. The selectable period of time should be about the same as sampling period or block used to generate the statistical parameters during operation, but in some instances or implementations the selectable period of time may be different (even significantly so) than the sampling period or block used to generate the statistical parameters during operation. Such a process may be user initiated or automated, for example.

The event detector 108 may be implemented using any number of techniques. For example, the event detector 108 may comprise one or more of a rule-based engine, a fuzzy logic engine, a pattern detector, a neural network, etc. Additionally, the example event detector 108 discussed above provides indications of whether events have occurred based upon the operation of rules. It should be understood that, in other examples, an output of the event detector 108 corresponding to an event may have a plurality of discrete or continuous values.

Figure 3:
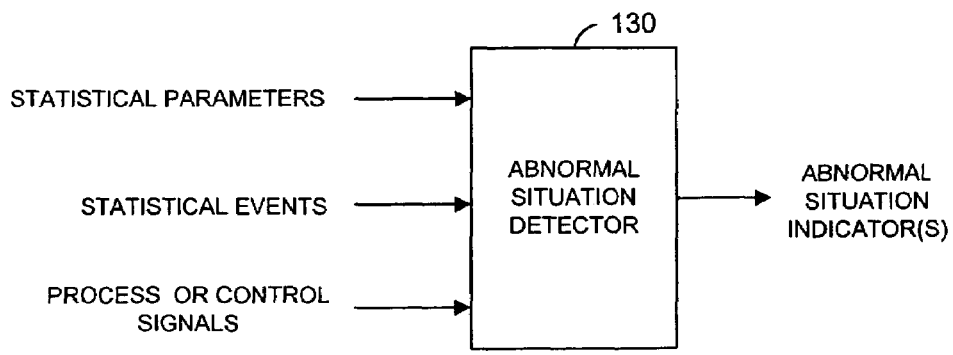
FIG. 3 is a block diagram of an example system for detecting an abnormal situation associated with a heater unit.

FIG. 3 is a block diagram of an example abnormal situation detector 130 for detecting an abnormal situation associated with a heater unit such as the heater unit 16 of FIG. 1. In general, the abnormal situation detector 130 may be used to detect an abnormal situation associated with a heater unit based on statistical data generated based on process variables associated with the heater unit.

The abnormal situation detector 130 may analyze one or more statistical parameters such as statistical parameters generated by one or more statistical parameter generators 104 (FIG. 2), one or more SPM blocks, one or more ADBs, etc. Additionally, the abnormal situation detector 130 may analyze statistical event indicators such as statistical event indicators generated by one or more event detectors 108 (FIG. 2), one or more SPM blocks, one or more ADBs, etc. Further, the abnormal situation detector 130 may analyze one or more process signals, control signals, etc., associated with the heater unit. The abnormal situation detector 130 may also analyze other data such as the alerts, alarms, diagnostic data, etc., generated by other devices in the process plant. The abnormal situation detector 130 need not analyze all of the data illustrated in FIG. 3 (i.e., statistical parameters, statistical event indicators, process signals, control signals, etc.). For example, the abnormal situation detector 130 may analyze only one or more statistical parameters. As another example, the abnormal situation detector 130 may analyze only one or more statistical event indicators. Thus, the abnormal situation detector 130 may analyze any combination of the data illustrated in FIG. 3 as well as data not illustrated in FIG. 3.

The abnormal situation detector 130 analyzes various data to determine if an abnormal situation exists, and thus if an alert or alarm should be sent to a user, for example. Of course, if desired, the output of the abnormal situation detector 130 may be used to take other actions, besides providing or setting an alarm, if an abnormal situation is detected. Such actions may include, for example, adjusting or shutting off fuel to the heater unit, adjusting a damper of the heater unit, shutting down one or more components of the process, switching or adjusting control parameters to alter the control of the process, etc.

The abnormal situation detector 130 may be implemented, at least partially, by one or more field devices associated with the heater unit. Additionally or alternatively, the abnormal situation detector 130 may be implemented, at least partially, by some other device such as one or more other computing devices such as the controller 12, the workstation 14, etc. Further, the abnormal situation detector 130 may be implemented, at least partially, by one or more devices (e.g., field devices, a controller, a workstation, etc.) not associated with the heater unit. If the abnormal situation detector 130 is implemented, at least partially, by some device other than the field devices, the abnormal situation detector 130 may be, at least partially, a client system or part of a client system that reads the statistical parameters, statistical event indicators, etc., from field devices via, for example, the communication server 60, the controller 12, etc. The abnormal situation detector 130 may comprise one or more of, for example, a rule-based system, a pattern detector, a fuzzy logic system, a neural network, etc.

The indicator(s) generated by the abnormal situation detector 130 may comprise, for example, an alert, an alarm, etc., that can be displayed to a plant operator, or sent to another appropriate person. Referring also to FIG. 1, if the abnormal situation detector 130 is implemented by a field device, the indicator(s) may be transmitted to another device such as the controller 12, the workstation 14, the communication server 60, etc., so that, for example, an operator can be made aware of the indicator(s). The field device could transmit the indicator at its own initiative or at the request of some other device. For example, some other device such as the controller 12, the workstation 14, the communication server 60, etc., could poll the field device as to whether it has detected an abnormal situation associated with the heater unit. In response, the field device could transmit the indicator via the bus 18 or some other communication link. As another example, the indicator could be stored in a memory and some other device could read the memory to determine if an abnormal situation associated with the heater unit had been detected.

The output of the abnormal situation detector 130 could be used, not merely to notify an operator, but also to, for example, directly affect control of the heater unit 16 or some other portion of the process plant. For example, the indicator generated by the abnormal situation detector 130 could be provided to one or more of a control block or routine, to a maintenance system, etc. For instance, the output of the abnormal situation detector 130 could be provided to the controller 12 which could, for example, shut off fuel to the heater unit 16, adjust the damper, etc., if one or more abnormal situations are detected.

Figure 4:
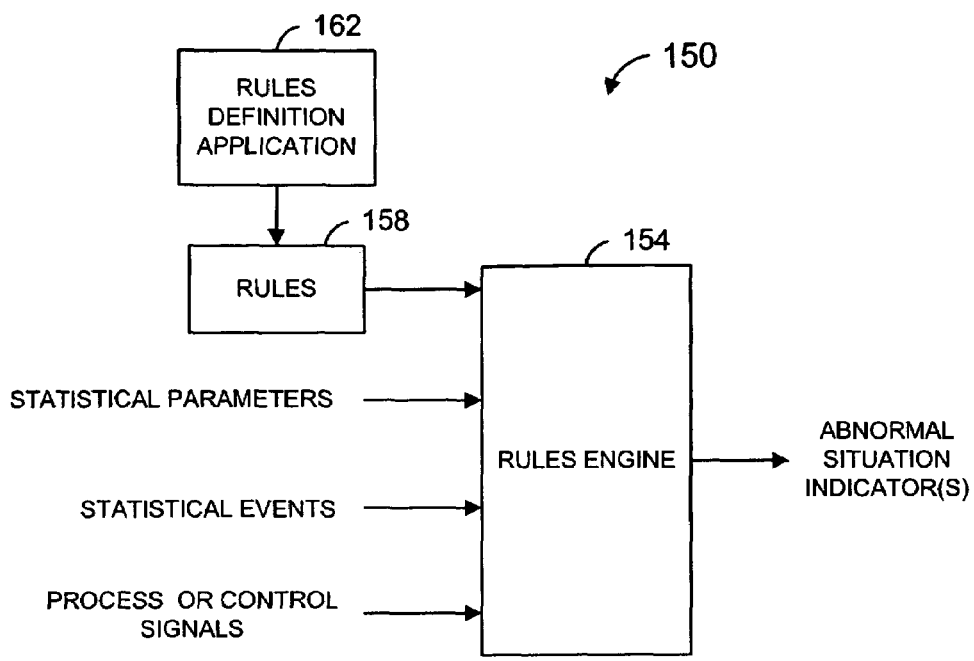
FIG. 4 is a block diagram of an example rule-based system for detecting an abnormal situation associated with a heater unit.

FIG. 4 is a block diagram of one example implementation of the abnormal situation detector 130. In this example, the abnormal situation detector 130 comprises a rule-based system 150. In general, the rule-based system 150 may be used to detect an abnormal situation associated with a heater unit based on statistical data associated with process signals.

The rule-based system 150 may include a rules engine 154, which may be any type of rules based expert engine and a set of rules 158 which may be stored in a database (such as within memories of one or more field devices, a memory of the controller 12, a memory of the workstation 14, etc.) accessible by the rules engine 154. The rules engine 154 may analyze data as described above with respect to the abnormal situation detector 130 of FIG. 3.

The rules engine 154 applies the rules 158 to the statistical parameters, statistical event indicators, process and/or control variables, alarms, alerts, etc., to determine if an abnormal situation exists that indicates, according to at least one of the rules 158, that an alert or alarm should sent to a user, for example. Of course, if desired, the output of the rules engine 158 may be used to take other actions, besides providing or setting an alarm, if a rule indicates that a problem exists. Such actions may include, for example, adjusting or shutting off fuel to the heater unit, adjusting a damper of the heater unit, shutting down or more components of the process, switching or adjusting control parameters to alter the control of the process, etc.

Optionally, a rules development application or routine 162 may enable a user to develop one or more expert system rules (e.g., to be used as one of the rules 158) based on statistical data patterns and their correlations, to thereby detect abnormal situations associated with the heater unit. Thus, while at least some of the rules 158 used by the rules engine 154 may be preset or preconfigured, the rules development application 162 enables a user to create other rules based on experiences within the process plant being monitored. For example, if a user knows that a certain combination of SPM parameter conditions or events indicates a certain problem with the heater unit, the user can use the rules development application 162 to create an appropriate rule to detect this condition and/or, if desired, to generate an alarm or alert or to take some other action based on the detected existence of this condition. U.S. Provisional Patent Application No. 60/549,796, filed Mar. 3, 2004, and entitled "ABNORMAL SITUATION PREVENTION IN A PROCESS PLANT" describes example rules development applications and configuration screens that may be used to create rules for detecting abnormal situations and/or, if desired, for generating alarms, alerts, or for taking some other action based on the detected existence of abnormal situations. Similar or different rules development applications may be used as well to develop the rules 158. U.S. Provisional Patent Application No. 60/549,796 is hereby incorporated by reference herein in its entirety for all purposes.

During operation of the process plant, the rules engine 154, which may be configured to receive the statistical parameters, statistical event indicators, for example, (and any other needed data), applies the rules 158 to determine if any of the rules are matched. If an abnormal situation associated with the heater unit is detected based on one or more of the rules 158, an indicator of the abnormal situation may be generated.

The rules engine 154 may be implemented, at least partially, by one or more field devices associated with the heater unit. Additionally or alternatively, the rules engine 154 may be implemented, at least partially, by some other device such as one or more other computing devices such as the controller 12, the workstation 14, etc. Further, the rules engine 154 may be implemented, at least partially, by one or more devices (e.g., field devices, a controller, a workstation, etc.) not associated with the heater unit. If the rules engine 154 is implemented, at least partially, by some device other than the field devices, the rules engine 154 may be, at least partially, a client system or part of a client system that reads the statistical parameters, statistical event indicators, etc., from field devices via, for example, the communication server 60, the controller 12, etc.

The indicator(s) generated by the rules engine 154 may comprise, for example, an indicator or indicators as described above with respect to the output of the abnormal situation detector 130 of FIG. 3. Also, the output of the rules engine 154 could be used, not merely to notify an operator, but also to, for example, directly affect control of the heater unit 16 or some other portion of the process plant as described above with respect to the output of the abnormal situation detector 130 of FIG. 3.

Figure 5:
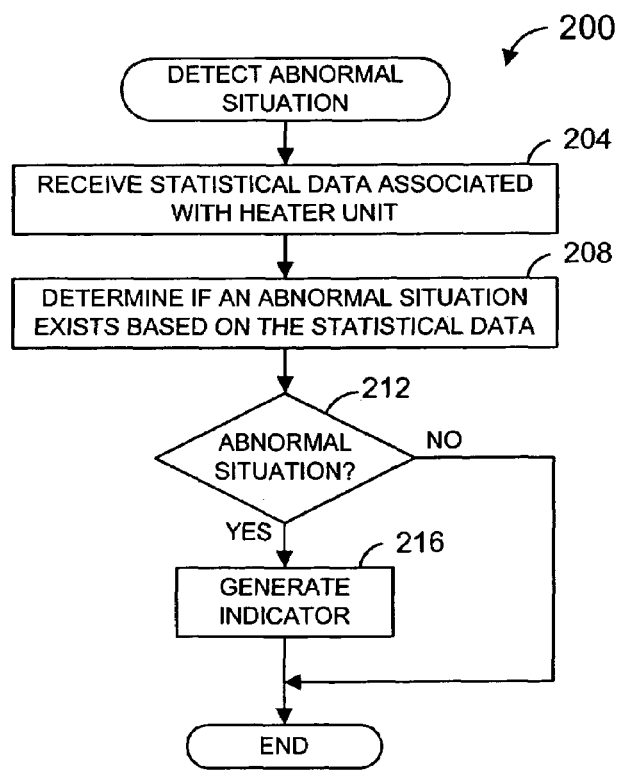
FIG. 5 is a flow diagram of an example method for detecting an abnormal situation associated with a heater unit.

FIG. 5 is a flow diagram of an example method 200 that may be implemented by the abnormal situation detector 130 of FIG. 3 and/or the rule-based system 150 of FIG. 4 to detect an abnormal situation associated with a heater unit. For example, the method 200 may be used to detect if a smoke release or a flame-out has occurred, is about to occur, is likely to occur, etc. Although FIG. 4 will be discussed with reference to FIGS. 1-4, it is to be understood that the method 200 or a similar method could be implemented by systems different than the system 10, the subsystem 100, the abnormal situation detector 130, and the rule-based system 150.

At a block 204, statistical data associated with process signals from the heater unit are received. For example, the abnormal situation detector 130 or the rules engine 154 may receive statistical parameters from the statistical parameter generator 104 and/or indications of events from the event detector 108. In general, the statistical data received at the block 204 may comprise, for example, one or more of a mean, a variance, a standard deviation, a root-mean square, a rate of change, a range, a maximum, a minimum, etc., associated with a process signal. Additionally or alternatively, the statistical data may comprise one or more indicators of events such as drift, bias, noise, stuck, spike, cyclic, etc. The statistical data may comprise other statistical measures or indicators associated with a process variable in addition to, or instead of, the statistical measures and indicators explicitly listed above. As just one example, the statistical data may comprise correlation data associated with a process variable.

At a block 208, the statistical data received at the block 204 may be analyzed to determine if an abnormal situation associated with the heater unit exists. For example, the abnormal situation detector 130 or the rules engine 154 may analyze data received from the statistical parameter generator 104 and/or the event detector 108. Other data in addition to the statistical data received at the block 204 may also be analyzed. For example, one or more process signals and/or control signals could be analyzed. As another example, other types of data could be analyzed (e.g., alerts and/or alarms generated by the devices associated with the heater unit, diagnostics data, etc.).

At a block 212, if an abnormal situation has not been detected, the method may end. If, however, an abnormal situation has been detected, the flow may proceed to a block 216. At the block 216, an indicator of the abnormal situation may be generated. The indicator may comprise, for example, an alarm or alert to notify an operator. As another example, the indicator may additionally or alternatively comprise data for affecting a control routine or block.

Several additional example methods for detecting example abnormal situations associated with a heater unit are provided below. Although these methods are discussed with reference to FIGS. 1-4, it is to be understood that these methods or similar methods could be implemented by systems different than the system 10, the subsystem 100, the abnormal situation detector 130, and the rule-based system 150.

Figure 6:
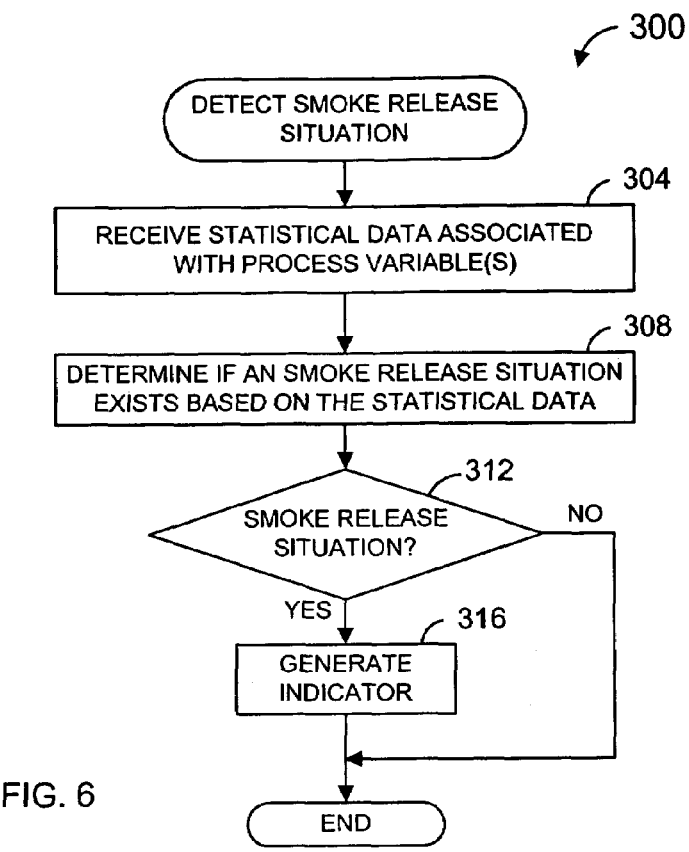
FIG. 6 is a flow diagram of an example method for detecting a smoke release situation associated with a heater unit.

FIG. 6 is a flow diagram of an example method 300 for determining if a smoke release situation associated with a heater unit exists. The method 300 may be implemented by a system such as the abnormal situation detector 130 of FIG. 3 or the rule-based system 150 of FIG. 4. The method 300 may be used to detect a smoke release in a heater unit, to predict a smoke release, etc.

At a block 304, statistical data associated with one or more process variables associated with the heater unit are received. For example, the abnormal situation detector 130 or the rules engine 154 may receive statistical data generated based on one or more process variables sensed by one or more sensors such as the sensors 32-38, 40, 42, 44, 46, and 48 of FIG. 1. The process variables may comprise one or more (or none) of fuel flow, air flow, stack pressure, temperature, O2, CO, etc. The statistical data could be generated based on individual process variables and/or combinations of process variables. As just one example, statistical data could be generated based on a differential pressure variable, which is in turn generated based on pressure variables sensed by a plurality of pressure sensors associated with the furnace 20 and/or the stack 22 of the heater unit 16.

The statistical data received at the block 304 may comprise, for example, parameters generated by the statistical parameter generator 104 and/or indications of events from the event detector 108. In general, the statistical data received at the block 304 may comprise, for example, one or more of a mean, a variance, a standard deviation, a root-mean square, a rate of change, a range, etc., associated with a process signal. Additionally or alternatively, the statistical data may comprise one or more indicators of events such as drift, bias, noise, stuck, spike, cyclic, etc. The statistical data may comprise other statistical measures or indicators associated with a process variable in addition to, or instead of, the statistical measures and indicators explicitly listed above. For example, the statistical data may comprise correlation data associated with a process variable.

At a block 308, the statistical data received at the block 304 may be analyzed to determine if a smoke release situation exists. For example, the abnormal situation detector 130 or the rules engine 154 may analyze data received from the statistical parameter generator 104 and/or the event detector 108. Other data in addition to the statistical data received at the block 304 may also be analyzed. For example, one or more process signals and/or control signals could be analyzed. As another example, other types of data could be analyzed (e.g., alerts and/or alarms generated by the devices associated with the heater unit, diagnostics data, etc).

As one example, the variability of pressure or differential pressure could be analyzed to determine if a smoke release situation exists. For instance, one or more of a standard deviation, variance, rate of change, a range, etc., of a pressure or differential pressure variable could be examined to detect increased variability or a change in variability. Additionally or alternatively, one or more of a noise event indicator, a spike event indicator, a cyclic indicator, etc., could be examined to detect increased variability or a change in variability. As another example, the variability of temperature or differential temperature could be analyzed to determine if a smoke release situation exists. For instance, one or more of a standard deviation, variance, rate of change, a range, etc., of a temperature or differential temperature variable could be examined to detect increased variability or a change in variability. Additionally or alternatively, one or more of a noise event indicator, a spike event indicator, a cyclic indicator, etc., could be examined to detect increased variability or a change in variability.

At a block 312, if a smoke release situation has not been detected, the method may end. If, however, a smoke release situation has been detected, the flow may proceed to a block 316. At the block 316, an indicator of the smoke release situation may be generated. The indicator may comprise, for example, an alarm or alert to notify an operator. As another example, the indicator may additionally or alternatively comprise data for affecting a control routine or block, adjusting a damper, etc.

Figure 7:
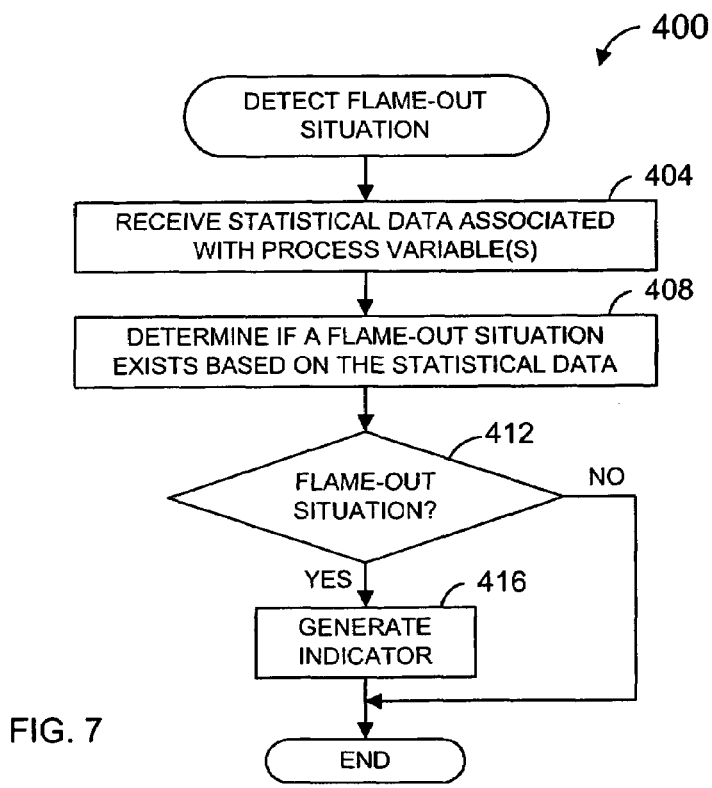
FIG. 7 is a flow diagram of an example method for detecting a flame-out situation associated with a heater unit.

FIG. 7 is a flow diagram of an example method 400 for determining if a flame-out situation associated with a heater unit exists. The method 400 may be implemented by a system such as the abnormal situation detector 130 of FIG. 3 or the rule-based system 150 of FIG. 4. The method 400 may be used to detect a flame-out in a heater unit, to predict a flame-out, etc.

At a block 404, statistical data associated with one or more process variables associated with the heater unit are received. For example, the abnormal situation detector 130 or the rules engine 154 may receive statistical data generated based one or more process variables sensed by one or more sensors such as sensors 32-38, 40, 42, 44, 46, and 48 of FIG. 1. The process variables may comprise one or more (or none) of fuel flow, fuel pressure, floor draft pressure, etc. The statistical data could be generated based on individual process variables and/or combinations of process variables. As just one example, the statistical data may be generated based on a differential pressure variable, which is in turn generated based on a plurality of pressure variables sensed by a plurality of pressure sensors (not shown in FIG. 1) associated with the fuel supply for the heater unit 16. As another example, the statistical data may be generated based on a differential pressure variable, which is in turn generated based on a plurality of pressure variables sensed by a plurality of pressure sensors (not shown in FIG. 1) associated with the floor draft of the heater unit 16.

The statistical data received at the block 404 may comprise, for example, parameters generated by the statistical parameter generator 104 and/or indications of events from the event detector 108. In general, the statistical data received at the block 404 may comprise, for example, one or more of a mean, a variance, a standard deviation, a root-mean square, a rate of change, a range, etc., associated with a pressure signal. Additionally or alternatively, the statistical data may comprise one or more indicators of events such as drift, bias, noise, stuck, spike, cyclic, etc. The statistical data may comprise other statistical measures or indicators associated with a pressure variable in addition to, or instead of, the statistical measures and indicators explicitly listed above.

At a block 408, the statistical data received at the block 404 may be analyzed to determine if a flame-out situation exists. For example, the abnormal situation detector 130 or the rules engine 154 may analyze data received from the statistical parameter generator 104 and/or the event detector 108. Other data in addition to the statistical data received at the block 404 may also be analyzed. For example, one or more process signals and/or control signals could be analyzed. As another example, other types of data could be analyzed (e.g., alerts and/or alarms generated by the devices associated with the heater unit, diagnostics data, etc. Further, statistical data based on other process variables could be analyzed, such as data based on one or more of a temperature variable, an O2 variable, a CO variable, etc.

As just one example, the variability of pressure could be analyzed to determine if a flame-out situation exists. For instance, one or more of a standard deviation, variance, rate of change, a range, etc., of a pressure or differential pressure variable could be examined to detect increased variability or a change in variability of fuel pressure and/or floor draft pressure. Additionally or alternatively, one or more of a noise event indicator, a spike event indicator, a cyclic indicator, etc., could be examined to detect increased variability or a change in variability.

At a block 412, if a flame out situation has not been detected, the method may end. If, however, a flame out situation has been detected, the flow may proceed to a block 416. At the block 416, an indicator of the flame out situation may be generated. The indicator may comprise, for example, an alarm or alert to notify an operator. As another example, the indicator may additionally or alternatively comprise data for affecting a control routine or block, adjusting a fuel valve, etc.

Figure 8:
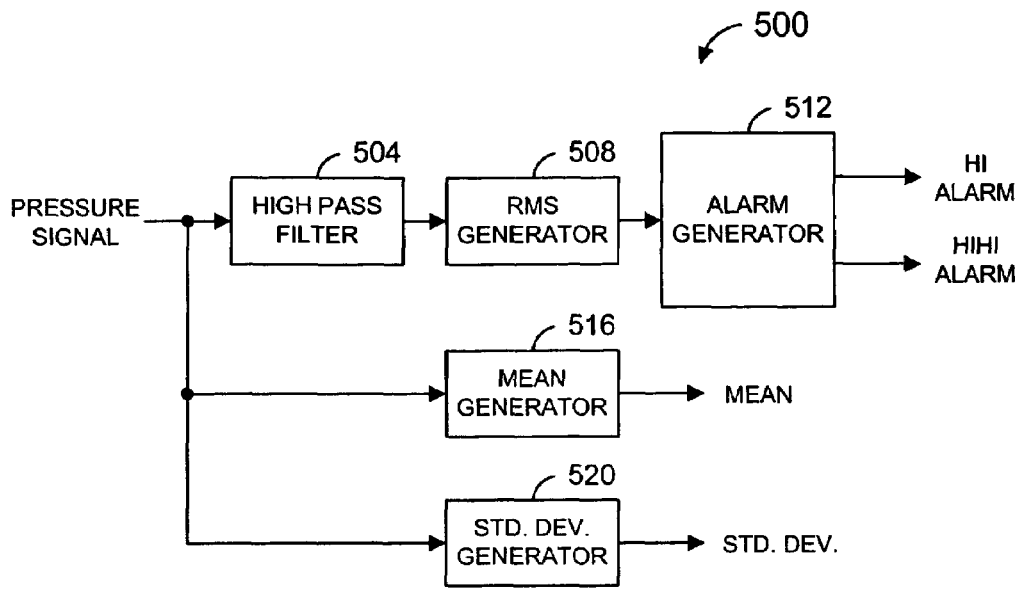
FIG. 8 is a block diagram of an example subsystem for generating statistical data based on a pressure signal.

FIG. 8 is a block diagram of an example subsystem 500 for generating statistical data associated with fuel pressure for fuel being fed to a furnace. The subsystem 500 could be implemented at least partially by as part of a data collection block of the pressure sensing device 32 of FIG. 1, for example. Additionally, some or all of the subsystem 500 may be implemented by a plurality of devices such as field devices, the controller 12, the workstation 14, the communication server 60, or some other computing device associated with the process plant. The subsystem 500 may be implemented, for example, as part of an ADB, an SPM block, etc.

The statistical data generated by the subsystem 500 may be used to detect a flame-out situation, for example. Some or all of the statistical data generated by the subsystem 500 could be provided to an abnormal situation detector such as the abnormal situation detector 130 of FIG. 3. Additionally or alternatively, some or all of the statistical data generated by the subsystem 500 could be presented to an operator. The operator could then decide if an action or actions should be taken based, at least in part, on the statistical data generated by the subsystem 500.

The subsystem 500 comprises a high pass filter 504 that filters the pressure signal to generate a filtered pressure signal. The high pass filter 504 may have a cutoff frequency at 1 Hz, 2 Hz, 3 Hz, 4 Hz, 5 Hz, 6 Hz, 7 Hz, 8 Hz, or 9 Hz, for example. In one example, the cutoff frequency of the high pass filter 504 may be configurable. For example, an operator may be able to select a cutoff frequency from one of 1 Hz, 2 Hz, 3 Hz, 4 Hz, 5 Hz, 6 Hz, 7 Hz, 8 Hz, and 9 Hz. The high pass filter 504 may be implemented using any number of techniques. For example, the high pass filter 504 may comprise an analog or a digital filter. If implemented as a digital filter, the high pass filter 504 may comprise a finite impulse response (FIR) filter or an infinite impulse response (IIR) filter. In one particular example, the high pass filter 504 comprises a configurable $16^{th}$ order FIR filter having a configurable cutoff at one of 1 Hz, 2 Hz, 3 Hz, 4 Hz, 5 Hz, 6 Hz, 7 Hz, 8 Hz, and 9 Hz. In general, the type of filter and the filter configuration (e.g., cutoff frequency) may depend on the particular implementation and/or the particular heater unit.

The subsystem 500 additionally comprises an RMS generator 508 that generates RMS parameters based on the filtered pressure signal generated by the high pass filter 504. In one example, the RMS parameters are generated using the equation:

$$\text{RMS} = \sqrt{\frac{1}{N-1}\sum_{i=1}^{N} x_i^2} \qquad \text{(Equ. 6)}$$

The RMS parameter could be generated using other equations or algorithms as well such as Equation 2. An alarm generator 512 receives the RMS parameters generated by the RMS generator 508 and generates alarms based at least partially on the RMS parameters. The alarms could be generated base on other inputs as well. In one example, the alarm generator 512 generates a HI alarm if the RMS parameter remains above a low threshold for a period of time, and generates a HIHI alarm if the RMS parameter remains above a high threshold for a period of time. The period of time could be measured using time or a number of samples, for example. The time period could one sample or a plurality of samples. This example the alarm generator will be discussed in more detail with respect to FIG. 10.

The subsystem 500 additionally comprises a mean generator 516 and a standard deviation generator 520 that generate mean parameters and standard deviation parameters, respectively, based on the pressure signal. The mean generator 516 may generate the mean parameter according to Equation 1 or some other equation or algorithm. The standard deviation generator 520 may generate the standard deviation parameter according to Equation 3 or some other equation or algorithm.

Figure 9:
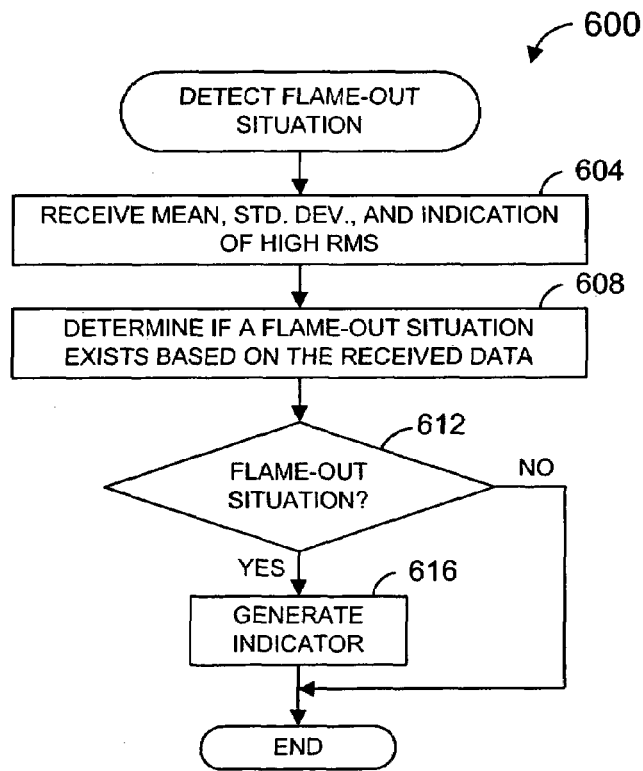
FIG. 9 is a flow diagram of another example method for detecting a flame-out situation associated with a heater unit.

FIG. 9 is a flow diagram of an example method 600 that may be used in conjunction with the example subsystem 500 to generate an indicator of a flame-out situation. At a block 604, one or more of the mean parameter, the standard deviation parameter, and the alarms generated by the subsystem 500 are received.

At a block 608, the statistical data received at the block 604 may be analyzed to determine if a flame-out situation exists. For example, the abnormal situation detector 130 or the rules engine 154 may analyze the received data. Other data in addition to the statistical data received at the block 604 may also be analyzed. For example, one or more process signals and/or control signals could be analyzed. As another example, other types of data could be analyzed (e.g., alerts and/or alarms generated by the devices associated with the heater unit, diagnostics data, etc. Further, statistical data based on other process variables could be analyzed, such as data based on one or more of a fuel flow variable, a temperature variable, an O2 variable, a CO variable, etc.

At a block 612, if a flame-out situation has not been detected, the method may end. If, however, a flame-out situation has been detected, the flow may proceed to a block 616. At the block 616, an indicator of the flame-out situation may be generated. The indicator may comprise, for example, an alarm or alert to notify an operator. As another example, the indicator may additionally or alternatively comprise data for affecting a control-routine or block, adjusting a fuel valve, etc.

Figure 10:
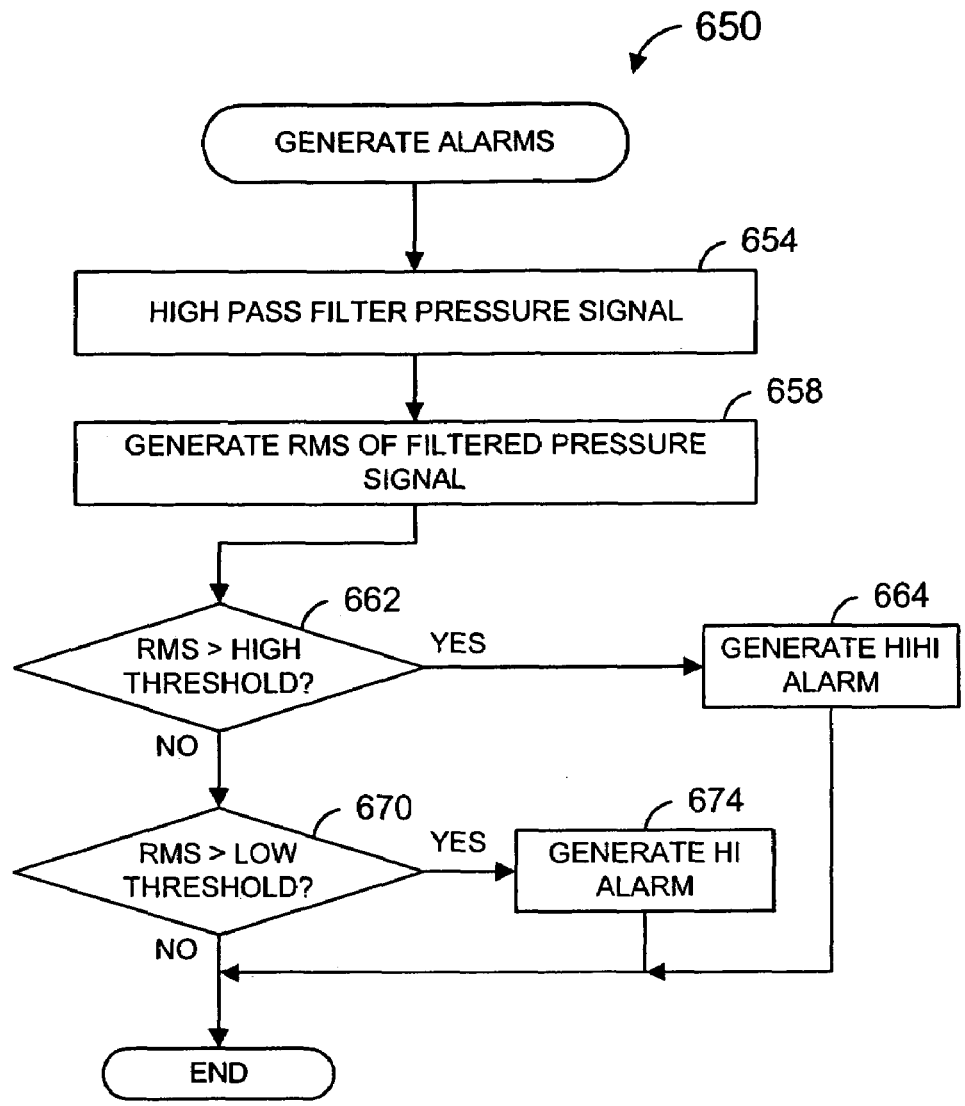
FIG. 10 is a flow diagram of an example method for generating alarms based on a pressure signal.

FIG. 10 is a flow diagram of an example method 650 that may be used to generate the alarms illustrated in FIG. 8. At a block 654, the pressure signal is high-pass filtered. At a block 658, RMS values for the filtered pressure signal are generated. At a block 662, it is determined whether the RMS values remain over a high threshold for a period of time. In one particular example, the high threshold is approximately 0.5 inches $H_2O$. If the RMS values remain over the high threshold for the period of time, a HIHI alarm is generated at a block 664. If the RMS values do not remain over the high threshold for the period of time, the flow proceeds to a block 670, at which it is determined whether the RMS values remain over a low threshold for a period of time. If the RMS values remain over the low threshold for the period of time, a HI alarm is generated at a block 674. In one particular example, the low threshold is approximately 0.35 inches $H_2O$. If the RMS values do not remain over the low threshold for the period of time, the flow may end. The period of time may be measured in terms of time and/or number of generated RMS values, for example. In one particular implementation, the period of time is one RMS value. In other implementations, the period of time may be two or more RMS values, a measure of time, etc.

Although particular thresholds were discussed above, one of ordinary skill in the art will understand that the thresholds used will depend on the particular implementation and/or the particular heater unit. Thus, different thresholds may be used. In one example, the above thresholds are provided as default values that can be reconfigured as needed or desired.

As described above, the example subsystem 500, the example method 600, and the example method 650 may utilize one or more fuel pressure signals in determining whether a flame-out situation exists and/or in determining whether an alarm is to be generated. Additionally or alternatively, one or more floor draft pressure signals could be utilized. For example, the filter 504 of FIG. 8 could receive signal(s) from one or more pressure sensing devices associated with the floor draft pressure of a heater unit. The subsystem 500 could be implemented at least partially by the pressure sensing device 37 of FIG. 1, for example, as part of a data collection block. For instance, the pressure sensing device 37 could be used to sense floor draft pressure of the heater unit 16.

Figure 11:
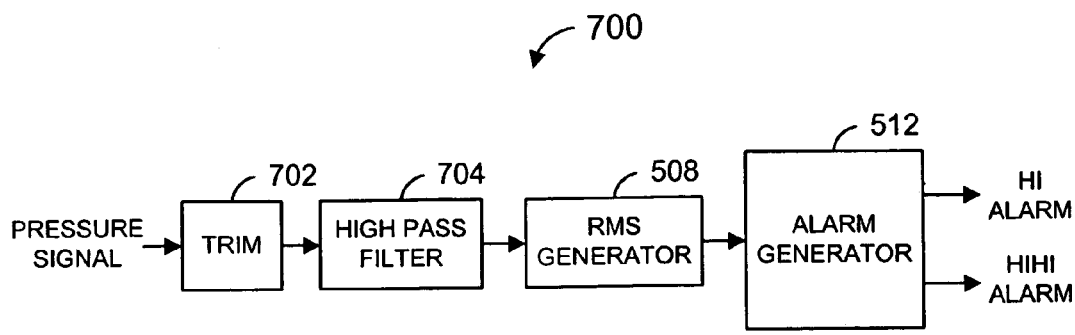
FIG. 11 is a block diagram of another example subsystem for generating statistical data based on a pressure signal.

FIG. 11 is a block diagram of an example subsystem 700 for generating statistical data associated with floor draft pressure associated with a furnace. The subsystem 700 includes some of the same blocks included in the example. subsystem 500 of FIG. 8. The subsystem 700 could be implemented at least partially by the pressure sensing device 37 of FIG. 1, for example, as part of a data collection block. Additionally, some or all of the subsystem 700 may be implemented by a plurality of devices such as field devices, the controller 12, the workstation 14, the communication server 60, or some other computing device associated with the process plant. The subsystem 700 may be implemented, for example, as part of an ADB, an SPM block, etc.

The statistical data generated by the subsystem 700 may be used to detect a flame-out situation, for example. Some or all of the statistical data generated by the subsystem 700 could be provided to an abnormal situation detector such as the abnormal situation detector 130 of FIG. 3. Additionally or alternatively, some or all of the statistical data generated by the subsystem 700 could be presented to an operator. The operator could then decide if an action or actions should be taken based, at least in part, on the statistical data generated by the subsystem 700.

The subsystem 700 comprises a trim unit 702 that discards or limits samples of the pressure signal that exceed an upper trim threshold or that are below a lower trim threshold. The trim thresholds could be fixed values or could be based on a range of the pressure signal. As just one example, the trim unit 702 could discard pressure signal samples that exceed 95% of the range (e.g., Equ. 5) of the pressure signal or that fall below 5% of the range of the pressure signal. One of ordinary skill in the art will recognize that any of a variety of trim units and thresholds can be used. In general, the type of trim unit and the thresholds may vary based on the particular implementation and/or the particular heater unit.

The subsystem 700 may also comprise a high pass filter 704 that filters the output of the trim unit 702 to generate a filtered pressure signal. The high pass filter 704 may have a cutoff frequency at 1 Hz, 2 Hz, 3 Hz, 4 Hz, 5 Hz, 6 Hz, 7 Hz, 8 Hz, or 9 Hz, for example. In one example, the cutoff frequency of the high pass filter 704 may be configurable. For example, an operator may be able to select a cutoff frequency from one of 1 Hz, 2 Hz, 3 Hz, 4 Hz, 5 Hz, 6 Hz, 7 Hz, 8 Hz, and 9 Hz. The high pass filter 704 may be implemented using any number of techniques. For example, the high pass filter 704 may comprise an analog or a digital filter. If implemented as a digital filter, the high pass filter 704 may comprise an FIR filter or IIR filter. In one particular example, the high pass filter 704 comprises a FIR filter that operates according to the equation:

$$y_k = x_k - x_{k-1} \qquad \text{(Equ. 7)}$$

where $y_k$ is the $k^{th}$ output of the filter, $x_k$ is the $k^{th}$ input to the filter, and $x_{k-1}$ is the $k-1^{th}$ input to the filter. One of ordinary skill in the art will recognize that any of a variety of filters can be used. In general, the type of filter and the configuration (e.g., cutoff frequency) may vary based on the particular implementation and/or the particular heater unit. In other implementations, a low pass filter or a band pass filter could be used, for example. Similarly, a higher order high pass filter could be used.

One of ordinary skill in the art will recognize that the example subsystem 700 may be modified in a variety of ways. For example, blocks may be omitted, different blocks may be added, and/or the arrangement of blocks may be changed. As just one example, the order of the blocks 702 and 704 could be reversed so that the pressure signal is first filtered and then trimmed.

Figure 12:
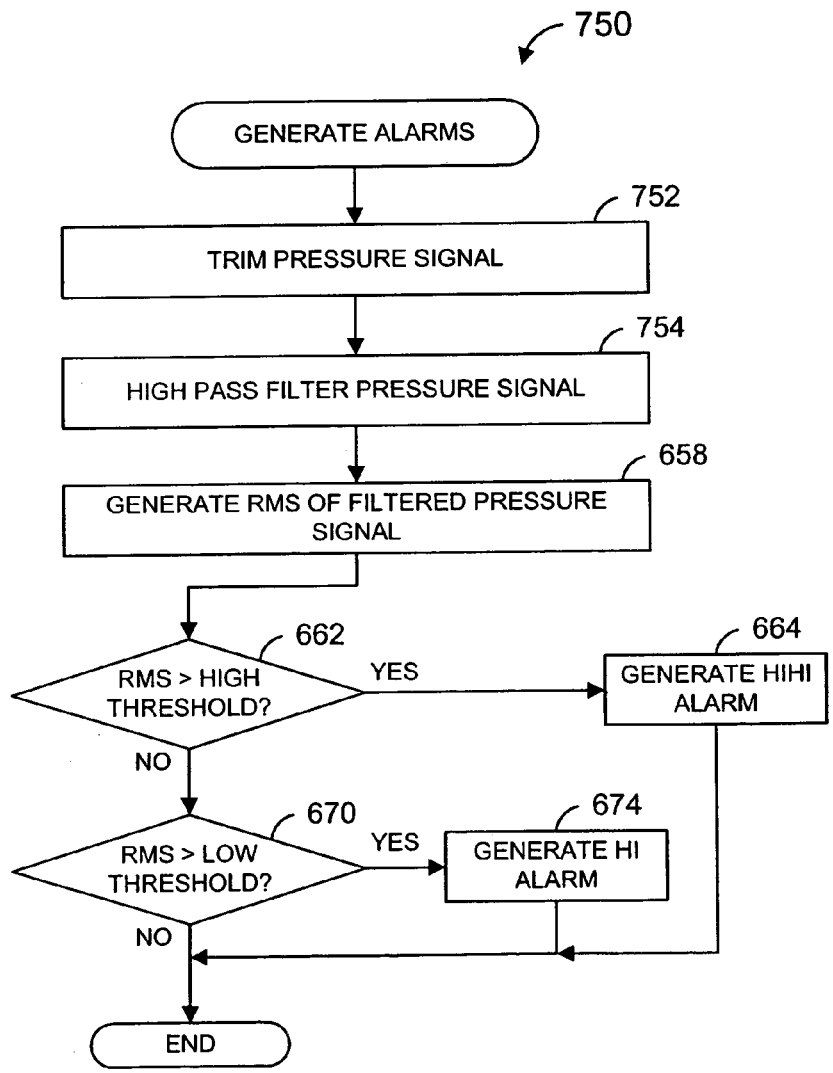
FIG. 12 is a flow diagram of another example method for generating alarms based on a pressure signal.

FIG. 12 is a flow diagram of an example method 750 that may be used to generate the alarms illustrated in FIG. 11. The method 750 includes some of the same blocks included in the example method 650 of FIG. 10. At a block 752, the pressure signal may be trimmed in a manner discussed above with respect to FIG. 11, for example. At a block 754, the trimmed pressure signal may be high-pass filtered in a manner discussed above with respect to FIG. 11, for example. Then, as with the method 650 of FIG. 10, a HI alarm or a HIHI alarm may be generated, if appropriate. The HI and HIHI alarms may be indicators of the abnormal condition. In other words, the alarm generator 512 may be an abnormal situation detector. Also, the HI and HIHI alarms may be inputs used by an abnormal situation detector, along with possibly other inputs, to determine if a flame-out situation exists and to generate an indicator of the flame-out situation. For instance, the alarm generator 512 may use other information in addition to the output of the RMS generator 508 to determine whether to generate the HI and HIHI alarms. Additionally, the output of the alarm generator 512 may be provided to a separate abnormal situation detector.

Although particular thresholds were discussed above, one of ordinary skill in the art will understand that the thresholds used will depend on the particular implementation and/or the particular heater unit. Thus, different thresholds may be used. In one example, the above thresholds are provided as default values that can be reconfigured as needed or desired.

Although example systems and methods for detecting a smoke release situation and detecting a flame-out situation were described above, one of ordinary skill in the art will recognize that similar systems and methods may be utilized that detect other abnormal situations associated with a heater. As just one example, statistical data may be used to determine if fouling (e.g., coke deposition) within tubes that route a process fluid through a furnace is occurring, to determine the extent of fouling, and/or to determine if fouling has reached a threshold level.

Some or all of the blocks of FIGS. 2 and 3 may be implemented in whole or in part using software, firmware, or hardware. Similarly, the example methods described with respect to FIGS. 4-8 may be implemented in whole or in part using software, firmware, or hardware. If implemented, at least in part, using a software program, the program may be configured for execution by a processor and may be embodied in software instructions stored on a tangible medium such as CD-ROM, a floppy disk, a hard drive, a digital versatile disk (DVD), or a memory associated with the processor, but persons of ordinary skill in the art will readily appreciate that the entire program or parts thereof could alternatively be executed by a device other than a processor, and/or embodied in firmware and/or dedicated hardware in a well known manner. Further, although the example methods have been described with reference to FIGS. 4-8, persons of ordinary skill in the art will readily appreciate that many other methods of implementing the example abnormal situation detector 130 and the rules engine 154 may alternatively be used. For example, the order of execution of the blocks may be changed, and/or the blocks may be changed, eliminated, or combined.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

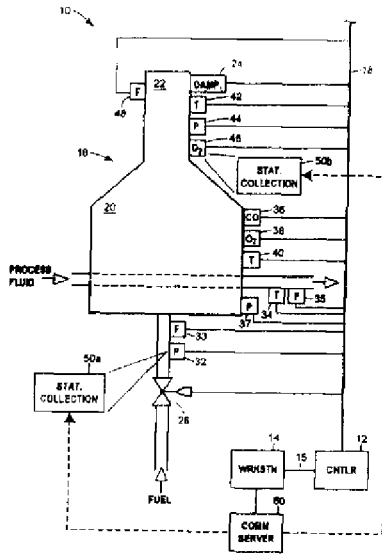

What is claimed is:

1. A method for detecting an abnormal situation associated with a heater in a process plant, the method comprising:
   receiving an indication of variability of fuel pressure associated with the heater, wherein the indication of variability of fuel pressure is calculated based on a fuel pressure variable generated by a fuel pressure sensor;
   analyzing at least the indication of variability of fuel pressure to detect whether variability of the fuel pressure is increased; and
   generating an indicator of a flame instability situation based on whether increased variability of the fuel pressure is detected.

2. A method as defined in claim 1, further comprising calculating statistical data indicative of variability of the fuel pressure wherein analyzing at least the indication of variability of fuel pressure includes analyzing the statistical data.

3. A method as defined in claim 2, wherein calculating the statistical data comprises filtering a fuel pressure signal and calculating at least one indication of a statistical event associated with the fuel pressure signal based on the filtered process signal.

4. A method as defined in claim 3, wherein calculating the statistical data further comprises at least one of trimming the fuel pressure signal prior to filtering the fuel pressure signal or trimming the fuel pressure signal after filtering the fuel pressure signal.

5. A method as defined in claim 2, wherein calculating the statistical data comprises calculating at least one statistical parameter based on a fuel pressure signal, wherein the at least one statistical parameter comprises at least one of a mean of the process signal, a standard deviation of the process signal, a variance of the process signal, a root-mean square of the process signal, a rate of change of the process signal, a range of the process signal, a maximum of the process signal, or a minimum of the process signal.

6. A method as defined in claim 2, wherein calculating the statistical data comprises calculating at least one indication of a statistical event associated with a fuel pressure signal, wherein the at least one indication of the statistical event comprises at least one of an indication that a spike in the fuel pressure signal occurred, an indication that a standard deviation of the fuel pressure signal is greater than a first threshold, an indication that the standard deviation of the fuel pressure signal is less than a second threshold, an indication that the fuel pressure signal includes cyclic oscillations, or an indication that the fuel pressure signal is erratic.

7. A method as defined in claim 1, further comprising calculating the indication of variability of fuel pressure based on a fuel pressure variable.

8. A method as defined in claim 7, wherein calculating the indication of variability of fuel pressure comprises calculating at least one statistical parameter based on a process signal, wherein the at least one statistical parameter comprises at least one of a standard deviation of the process signal, a variance of the process signal, a root-mean square of the process signal, a rate of change of the process signal, and a range of the process signal.

9. A method as defined in claim 7, wherein calculating the indication of variability of fuel pressure comprises calculating at least one indication of a statistical event associated with the fuel pressure, wherein the at least one indication of the statistical event comprises at least one of an indication that a spike in a fuel pressure occurred, and an indication that a standard deviation of the process signal is greater than a threshold.

10. A method as defined in claim 1, wherein receiving the indication of variability of fuel pressure comprises at least one of:
receiving statistical data generated by at least one sensor device;
receiving statistical data generated by a controller;
receiving statistical data generated by a server;
receiving statistical data generated by an advanced diagnostics block; or
receiving statistical data generated by a statistical process monitoring block.

11. A method as defined in claim 1, further comprising:
receiving an indication of variability of floor draft pressure associated with a floor draft of a furnace;
analyzing at least the indication of variability of floor draft pressure to detect whether variability of the floor draft pressure is increased; and
wherein generating the indicator of the flame instability situation is further based on whether increased variability of the floor draft pressure is detected.

12. A method as defined in claim 1, wherein receiving the statistical data comprises receiving a filtered value of a fuel pressure signal.

13. A method as defined in claim 1, further comprising generating an alert based on the indicator of the flame instability situation.

14. A method as defined in claim 1, further comprising adjusting a damper associated with the heater based on the indicator of the flame instability situation.

15. A method as defined in claim 1, further comprising adjusting a fuel supply valve associated with the heater based on the indicator of the flame instability situation.

16. A method according to claim 1, wherein generating the indicator of a flame instability situation comprises generating an indicator of a smoke release situation.

17. A method according to claim 1, wherein generating the indicator of a flame instability situation comprises generating an indicator of a flame-out situation.

18. The method as defined in claim 1, wherein the fuel pressure variable is indicative of fuel pressure in a fuel line.

19. A system for detecting an abnormal situation associated with a heater in a process plant, the system comprising:
a statistical data generator to generate statistical data based on at least a fuel pressure variable sensed by at least one sensor device associated with the heater, the statistical data indicative of variability of fuel pressure, wherein the at least one sensor device is a fuel pressure sensor; and
an abnormal situation detector to detect flame instability based at least on whether variability of the fuel pressure variable is increased.

20. A system as defined in claim 19, wherein the statistical data generator is included in at least one of a sensor device, a process controller, a server, an advanced diagnostics block, or a statistical process monitoring block.

21. A system as defined in claim 20, wherein the statistical data generator comprises at least one fuel pressure sensor device of the at least one sensor device associated with the heater.

22. A system as defined in claim 19, wherein the statistical data comprises statistical data calculated based on a filtered value of the fuel pressure signal.

23. A system as defined in claim 22, wherein the statistical data comprises statistical data calculated based on at least one of a trimmed and then filtered fuel pressure signal or a filtered and then trimmed fuel pressure signal.

24. A system as defined in claim 19, wherein the abnormal situation detector is configured to generate an indicator of flame instability if flame instability is detected.

25. A system as defined in claim 24, wherein the abnormal situation detector is configured to generate an alert if flame instability is detected.

26. A system as defined in claim 19, wherein the statistical data is further based on a floor draft pressure variable, wherein the statistical data is further indicative of variability of floor draft pressure, and wherein the abnormal situation detector is to detect flame instability further based on whether variability of the floor draft pressure variable is increased.

27. A system as defined in claim 19, wherein the statistical data comprises at least one statistical parameter, the at least one statistical parameter comprising at least one of a standard deviation of the fuel pressure variable, a variance of the fuel pressure signal, a root-mean square of the fuel pressure signal, a rate of change of the fuel pressure signal, or a range of the fuel pressure signal.

28. A system as defined in claim 19, wherein the statistical data comprises at least one indication of a statistical event, wherein the at least one indication of the statistical event comprises at least one of an indication that a spike in the fuel pressure variable occurred, an indication that a standard deviation of the fuel pressure variable is greater than a threshold or an indication that the fuel pressure variable is erratic.

29. A system as defined in claim 19, wherein the statistical data comprises a filtered value of the fuel pressure variable.

30. A system as defined in claim 19, wherein the abnormal situation detector comprises at least one of a rule-based engine, a pattern detector, a fuzzy logic system, or a neural network.

31. A system as defined in claim 19, wherein the abnormal situation detector is configured to detect a smoke release situation.

32. A system as defined in claim 19, wherein the abnormal situation detector is configured to detect a flame-out situation.

33. The system as defined in claim 19, wherein the fuel pressure variable is indicative of fuel pressure in a fuel line.

34. A method for generating an alarm associated with a heater in a process plant, the method comprising:
receiving a pressure variable sensed by a pressure sensor associated with the heater;
filtering the pressure variable using a high pass filter;
generating a root mean square value of the pressure variable;
comparing the root mean square value to a threshold; and
generating an alarm based on the comparison of the root mean square value to the threshold; and
wherein receiving the pressure variable comprises receiving at least one fuel pressure variable sensed by at least one pressure sensor associated with a fuel supply of the heater or receiving at least one floor draft pressure variable sensed by at least one pressure sensor associated with a floor draft of a furnace.

35. A method according to claim 34, wherein generating the alarm comprises generating the alarm based on a plurality of comparisons of root mean square values to the threshold.

36. A method according to claim 35, wherein generating the alarm if root mean square values are above the threshold for a period of time.

37. A method according to claim 34, further comprising at least one of trimming the pressure variable prior to filtering the pressure variable or trimming the pressure variable after filtering the pressure variable.

38. A tangible medium storing machine readable instructions capable of causing one or more machines to:

receive an indication of variability of fuel pressure associated with the heater, wherein the indication of variability of fuel pressure is calculated based on a fuel pressure variable generated by a fuel pressure sensor;

analyze at least the indication of variability of fuel pressure to detect whether variability of the fuel pressure is increased ; and generate an indicator of a flame instability situation based on whether increased variability of the fuel pressure is detected.

39. The tangible medium as defined in claim 38, wherein the fuel pressure variable is indicative of fuel pressure in a fuel line.

* * * * *

UNITED STATES PATENT AND TRADEMARK OFFICE
CERTIFICATE OF CORRECTION

PATENT NO. : 7,536,274 B2
APPLICATION NO. : 11/079808
DATED : May 19, 2009
INVENTOR(S) : Louis W. Heavner, III et al.

It is certified that error appears in the above-identified patent and that said Letters Patent is hereby corrected as shown below:

Title page should be deleted and substitute therefore the title page as shown on the attached page.

At column 21, line 8, "flarne-out" should be -- flame-out --.

Signed and Sealed this

Twenty-sixth Day of January, 2010

David J. Kappos
*Director of the United States Patent and Trademark Office*

United States Patent
Heavner, III et al.

(10) Patent No.: US 7,536,274 B2
(45) Date of Patent: May 19, 2009

(54) SYSTEM AND METHOD FOR DETECTING AN ABNORMAL SITUATION ASSOCIATED WITH A HEATER

(75) Inventors: Louis W. Heavner, III, Austin, TX (US); Joseph H. Sharpe, Jr., Houston, TX (US); Evren Eryurek, Edina, MN (US); Kadir Kavaklioglu, Eden Prairie, MN (US)

(73) Assignee: Fisher-Rosemount Systems, Inc., Austin, TX (US)

(*) Notice: Subject to any disclaimer, the term of this patent is extended or adjusted under 35 U.S.C. 154(b) by 0 days.

(21) Appl. No.: 11/079,808

(22) Filed: Mar. 14, 2005

(65) Prior Publication Data
US 2005/0267710 A1    Dec. 1, 2005

Related U.S. Application Data

(63) Continuation-in-part of application No. 10/944,609, filed on Sep. 17, 2004, now abandoned.

(60) Provisional application No. 60/575,631, filed on May 28, 2004.

(51) Int. Cl.
*G06F 11/30* (2006.01)

(52) U.S. Cl. .................................. 702/183

(58) Field of Classification Search .............. 702/47, 702/50, 57, 98, 100, 116, 138, 179, 182–185, 702/188, 115; 60/776; 251/129.07; 123/357; 417/1

See application file for complete search history.

(56) References Cited

U.S. PATENT DOCUMENTS

| 4,359,984 A | * | 11/1982 | Nakao ................. 123/357 |
| 4,477,245 A | * | 10/1984 | Giachino et al. ............. 431/78 |
| 4,527,271 A | | 7/1985 | Hallee et al. |
| 4,607,325 A | | 8/1986 | Horn |

(Continued)

FOREIGN PATENT DOCUMENTS

DE    102 32 164    2/2004

(Continued)

OTHER PUBLICATIONS

Wemwe Kalkhoff, "Agent-Oriented Robot Task Transformation", Proceedings of the International Symposium on Intelligent Control, IEEE, pp. 242-247 (Aug. 27, 1995).

(Continued)

*Primary Examiner*—Edward Raymond
*Assistant Examiner*—Mohamed Charioui
(74) *Attorney, Agent, or Firm*—Marshall, Gerstein & Borun LLP

(57) ABSTRACT

A system for detecting abnormal situations associated with a heater in a process plant receives statistical data associated with the heater unit. The statistical data is analyzed to detect whether one or more abnormal situations associated with the heater exist. The statistical data may comprise statistical data generated based on pressure variables sensed by one or more pressure sensors associated with a furnace, a stack, a fuel supply, etc., associated with the heater. Additionally, the statistical data may comprise statistical data generated based on temperature variables sensed by one or more temperature sensors associated with the furnace, the stack, etc. If an abnormal situation is detected, an indicator of the abnormal situation may be generated.

39 Claims, 7 Drawing Sheets